United States Patent
Montgomery, III et al.

(10) Patent No.: US 12,012,292 B2
(45) Date of Patent: Jun. 18, 2024

(54) PRODUCT CONVEYOR SYSTEMS AND METHODS OF CONTROLLING CONVEYOR SYSTEMS

(71) Applicant: Walmart Apollo, LLC, Bentonville, AR (US)

(72) Inventors: Willie Montgomery, III, Rogers, AR (US); Charls Christo Irus Antony, Bentonville, AR (US); Nathan A. Waits, Gentry, AR (US); Zhuofei Li, Rogers, AR (US); Yu Wang, Beijing (CN); Manoj Krishna, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 765 days.

(21) Appl. No.: 17/188,702

(22) Filed: Mar. 1, 2021

(65) Prior Publication Data
US 2021/0269255 A1    Sep. 2, 2021

Related U.S. Application Data

(60) Provisional application No. 62/984,226, filed on Mar. 2, 2020.

(51) Int. Cl.
*B65G 47/72* (2006.01)
*B65G 67/08* (2006.01)
*G06Q 10/0835* (2023.01)

(52) U.S. Cl.
CPC ............. *B65G 47/72* (2013.01); *B65G 67/08* (2013.01); *G06Q 10/08355* (2013.01); *B65G 2203/0216* (2013.01); *B65G 2203/0233* (2013.01)

(58) Field of Classification Search
CPC ........ B65G 47/72; B65G 67/08; B65G 47/50; B65G 47/71; B65G 67/04; B65G 43/10;
(Continued)

(56) References Cited

U.S. PATENT DOCUMENTS 4,227,607 A * 10/1980 Malavenda ............. B64F 1/368
198/572
6,560,509 B2    5/2003 Williams
(Continued)

*Primary Examiner* — Patrick H Mackey
(74) *Attorney, Agent, or Firm* — Fitch, Even, Tabin & Flannery LLP

(57) ABSTRACT

In some embodiments, systems and methods are provided to control a product distribution conveyor system comprising: a conveyor control circuit; a product feed conveyor system; conveyor lane systems cooperated with the conveyor lane system; routing systems that cause movement of respective products from the feed conveyor system to one of the conveyor lane systems; and a plurality of sensor systems; wherein the conveyor control circuit is further configured to enhance throughput of the at least one feed conveyor system by associating each of the plurality of conveyor lane systems one of a plurality of retail stores such that a total volume of the products is substantially equally distributed over the plurality of conveyor lane systems comprising organizationally subdividing conveyor lane systems to define a plurality of lane subdivisions, and associating each retail store with a respective one of the plurality of lane subdivisions.

20 Claims, 13 Drawing Sheets

(58) Field of Classification Search
CPC .... B65G 2203/0216; B65G 2203/0233; G06Q 10/08355
See application file for complete search history.

(56) References Cited

U.S. PATENT DOCUMENTS

| | | | |
|---|---|---|---|
| 7,120,596 | B2 | 10/2006 | Hoffman |
| 10,137,816 | B2* | 11/2018 | Harper ............... G06Q 10/0833 |
| 10,766,711 | B2* | 9/2020 | Lundahl .................... B07C 3/18 |
| 10,835,928 | B2* | 11/2020 | Bellar ..................... G06F 18/00 |
| 11,348,196 | B2* | 5/2022 | Kim .......................... G06T 7/50 |
| 11,383,937 | B2* | 7/2022 | Lisso ..................... B65G 47/30 |
| 11,878,862 | B2* | 1/2024 | Bellar ..................... B07C 3/003 |
| 2014/0058776 | A1 | 2/2014 | Aoyama |
| 2014/0135969 | A1* | 5/2014 | Groth ................. G05B 19/4189 |
| | | | 700/112 |
| 2018/0150798 | A1 | 5/2018 | Wilkinson |
| 2018/0334325 | A1 | 11/2018 | Lert |
| 2019/0367278 | A1* | 12/2019 | Bellar ................... G06Q 10/08 |
| 2021/0061562 | A1* | 3/2021 | Wolf .................. G06Q 10/08 |
| 2021/0362194 | A1* | 11/2021 | Lundahl ................ B65G 43/08 |
| 2021/0380342 | A1* | 12/2021 | Wright ................... G07F 9/105 |
| 2022/0002085 | A1* | 1/2022 | Bellar ................. B65G 1/1376 |

* cited by examiner

Loader Scheduling

[Home] [Schedule] [Change Mode] [Help] [Logout]

Distribution Center # 6048

| DC Name: Oepl, LA DPS | Total Lanes 0 | # of Associates 20 |
| Location: Opel, LA | (Previous Schedule) | (Previous Schedule) |
| Bld Type: Regional | # of closed Lanes 0 | |
| | (Previous Schedule) | |

✓ Step 1
DC Info

② Step 2
Lane Info

Associate Information

Enter # of Associates

[Enter # of Associates]

Lane Information

Upload Lane Information

[Upload file] [🔍 Browse]

Download template

[Back] [Submit]

602          604

PRODUCT CONVEYOR SYSTEMS AND METHODS OF CONTROLLING CONVEYOR SYSTEMS

CROSS-REFERENCE TO RELATED APPLICATION(S)

This application claims the benefit of U.S. Provisional Application No. 62/984,226 filed Mar. 2, 2020, which is incorporated herein by reference in its entirety.

TECHNICAL FIELD

This invention relates generally to conveyor systems.

BACKGROUND

Conveyor systems have been used to move products through product distribution facilities. The quantities of products and the large numbers of conveyor lane systems can result in congestion and/or interrupted flow of products. Accordingly, there is a need to improve conveyor systems.

BRIEF DESCRIPTION OF THE DRAWINGS

Disclosed herein are embodiments of systems, apparatuses and methods pertaining conveyor systems in a product distribution facility and/or fulfillment center. This description includes drawings, wherein:

FIG. 6 illustrates a simplified, exemplary assignment GUI, in accordance with some embodiments.

Figure 1:
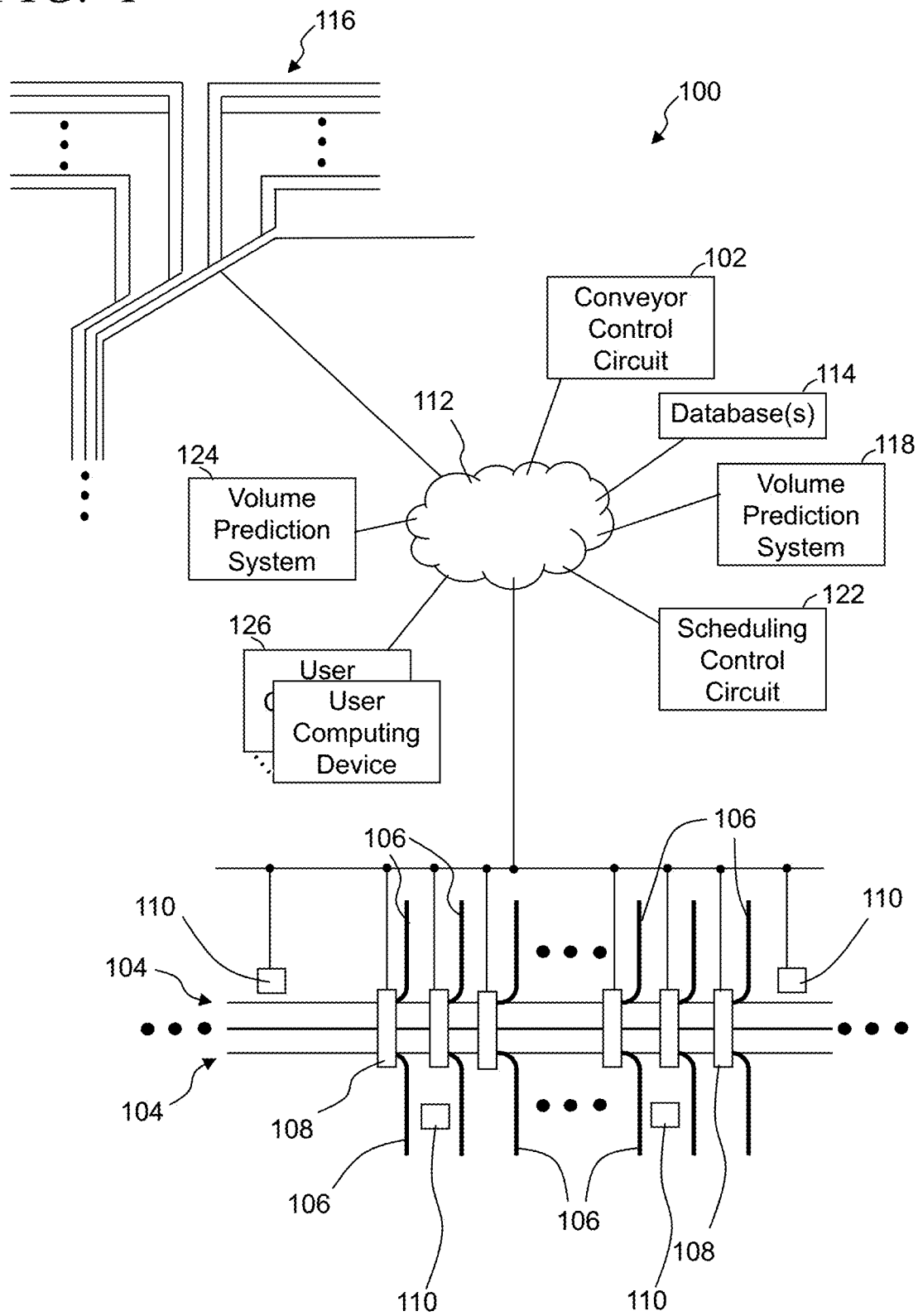
FIG. 1 illustrates a simplified block diagram of a product distribution conveyor system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

The described features, structures, or characteristics of the disclosed systems and methods may be combined in any suitable manner in one or more embodiments. In the following description, numerous specific details are provided, such as examples of systems, sub-systems, controllers, controls, programming, software modules, user selections, network transactions, database queries, database structures, hardware modules, hardware circuits, hardware chips, etc., to provide a thorough understanding of embodiments. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Retail products are often shipped to distribution facilities and fulfillment facilities that then route appropriate quantities of products to retail stores for sale to customers. As such, it is common for tens to hundreds of thousands of products to be moved through these facilities in preparing for and shipping products to tens or hundreds of different requesting retail stores. Large conveyor systems are implemented in such facilities to simplify and speed the distribution of retail products through the facilities to locations at the facilities to enable the products to be loaded into appropriate delivery vehicles that transport the ordered products to the intended retail stores and/or customers. Because of the large quantities of products being moved, congestion along the different conveyor branches of the conveyor systems can reduce the effectiveness of the conveyor systems.

Generally speaking, pursuant to various embodiments, systems, apparatuses and methods are provided herein useful implement and control one or more conveyor systems of a retail distribution and/or fulfillment facility applying one or more sets of rules to enhance computational processing, reduce memory usage, and improve the operation of the conveyor system. Some embodiments provide a product distribution conveyor system of a product distribution facility, wherein the product distribution conveyor system comprises: one or more conveyor control circuits, at least one product feed conveyor system, a plurality of conveyor lane systems, a plurality of routing systems and a plurality of sensor systems. In some implementations, the one or more product feed conveyor system includes at least one feed conveyor and multiple feed conveyor motor systems communicatively coupled with and controlled by the conveyor control circuit to implement movement and control of the feed conveyor to move products along the feed conveyor. The conveyor lane systems typically cooperate with and extend from one of the feed conveyor systems. Further, the conveyor lane systems are configured to receive products fed to the conveyor lane systems from the respective one of the feed conveyor systems. In some embodiments, each of the conveyor lane systems is associated with at least one bay door of the distribution facility and through which products are loaded into delivery vehicles. The conveyor lane systems comprises at least one lane conveyor and at least one lane motor communicatively coupled with and controlled by the conveyor control circuit to implement movement and control of the lane conveyor to move one or more of the products received from the feed conveyor system and along the lane conveyor toward the respective bay door.

The routing systems can be cooperated with at least one of the feed conveyor systems, and are communicatively coupled with the conveyor control circuit. The routing systems are positioned relative to and configured to cause the movement of respective products transported on the at least one feed conveyor system to a respective one of the lane conveyors of the plurality of conveyor lane systems. At least some of the plurality of sensor systems are positioned adjacent the at least one of the feed conveyors and the lane conveyors, and configured to detect product identifying information of each product moved along the respective one of the feed conveyors or the respective conveyor lane systems. The product identifying information of each of the products can be communicated to the conveyor control circuit. The conveyor control circuit can utilize the product identifying information to control the feed conveyor system and one or more of the plurality of routing systems to move each of the products onto an appropriate conveyor lane system associated with an intended retail store to receive the respective product.

In some embodiments, the control circuit is further configured to control and enhance throughput of the one or more feed conveyor systems by accessing association rules and applying the association rules to associate each of the plurality of conveyor lane systems with at least one of a plurality of retail stores that order products to be received from the distribution facility such that a total volume of the products shipped from the distribution facility is substantially equally distributed over the plurality of conveyor lane systems. The associating can, in some implementations, include organizationally subdividing the plurality of conveyor lane systems to define a plurality of lane subdivisions each comprising a subsets of multiple conveyor lane systems of the plurality of conveyor lane systems, and associating each retail store of the plurality of retail stores with a respective one of the plurality of lane subdivisions to minimize deviations of subdivision volumes of products moved through each of the plurality of lane subdivisions.

Further, some embodiments provide processes and/or methods of controlling product distribution through a distribution conveyor system of a product distribution facility, comprising: causing the transport of products along at least one product feed conveyor system comprising at least one feed conveyor and multiple feed conveyor motor systems communicatively coupled with and controlled by a conveyor control circuit and implementing movement and control of the feed conveyor to move the products along the feed conveyor and to respective ones of a plurality of conveyor lane systems configured to receive products fed to the conveyor lane systems from the feed conveyor system, wherein each of the conveyor lane systems is associated with at least one bay door of the distribution facility and through which products are loaded into delivery vehicles, and wherein each of the plurality of conveyor lane systems comprises at least one lane conveyor and at least one lane motor communicatively coupled with and controlled by the conveyor control circuit; detecting, through a plurality of sensor systems each positioned adjacent the at least one of the feed conveyor systems and the conveyor lane systems, product identifying information of each product moved along the at least one feed conveyor, and receiving the product identifying information of each of the products communicated from the sensor systems; controlling the feed conveyor system and movement of one or more of a plurality of routing systems cooperated with the at least one feed conveyor based on the product identifying information for each of the products to move each of the products along the at least one feed conveyor and move the respective products by the routing systems onto an appropriate conveyor lane system of the plurality of conveyor lane systems associated with an intended retail store to receive the respective product; controlling movement and control of the lane conveyor to move one or more of the products received from the feed conveyor system along the lane conveyor toward the respective bay door; controlling and enhancing throughput of the at least one feed conveyor system by accessing association rules and applying the association rules and associating each of the plurality of conveyor lane systems with at least one of a plurality of retail stores that order products to be received from the distribution facility such that a total volume of flow of the products shipped from the distribution facility is substantially equally distributed over the plurality of conveyor lane systems comprising organizationally subdividing the plurality of conveyor lane systems to define a plurality of lane subdivisions each comprising a subsets of multiple conveyor lane systems of the plurality of conveyor lane systems, and associating each retail store of the plurality of retail stores with a respective one of the plurality of lane subdivisions to minimize deviations of subdivision volumes of products moved through each of the plurality of lane subdivisions.

FIG. 1 illustrates a simplified block diagram of a product distribution conveyor system 100 implemented in a retail distribution facility, retail fulfillment facility or other relevant facility that distributes large quantities of products to be routed to numerous locations within the facility, in accordance with some embodiments. The product distribution conveyor system 100 includes one or more conveyor control circuits 102, at least one product feed conveyor system 104, a plurality of conveyor lane systems 106, a plurality of routing systems 108 and a plurality of sensor systems 110. One or more conveyor control circuits 102 are each communicatively coupled over a distributed, communication and/or computer network 112 with at least one of the product feed conveyor systems 104, the conveyor lane systems 106, the routing systems 108 and/or the sensor systems 110. In some implementations, the conveyor control circuit is implemented through multiple computers and/or servers that are communicatively coupled over the network 112 or another network. Further, the conveyor control circuit may be geographically distributed over multiple servers and/or computers that are geographically distributed over the network 112 to reduce demand one individual servers and/or computers, provide redundancy, and reduce latency. Still further, in some embodiments, the conveyor control circuit can provide control over multiple conveyor systems at multiple different retail distribution and/or fulfillment facilities.

In some embodiments, the product distribution conveyor system 100 includes one or more databases 114 storing one or more sets of rules, retail store information for multiple different retail stores, customer information, product information, routing information, conveyor lane system assignments, other such information, and typically a combination of two or more of such information. The conveyor control circuit 102 is communicatively coupled with the one or more databases 114 to access relevant information to provide control over the product distribution conveyor system 100.

The product distribution conveyor system 100 typically further includes one or more inbound conveyor systems 116 that are configured to move products received at the distribution facility. Further, the inbound conveyor systems 116 are configured to receive and transport products that are being delivered to the distribution facility to enable processing of the products and distribution of the products to storage areas within the distribution facility and/or to conveyor lane systems 106 in preparation for products to be loaded into delivery vehicles. The inbound conveyor system 116 includes one or more conveyor motors to control movement of the inbound conveyors, and sensor systems 110 to at least in part enable the conveyor control circuit to track movement of products through the inbound conveyor system 116.

Figure 2:
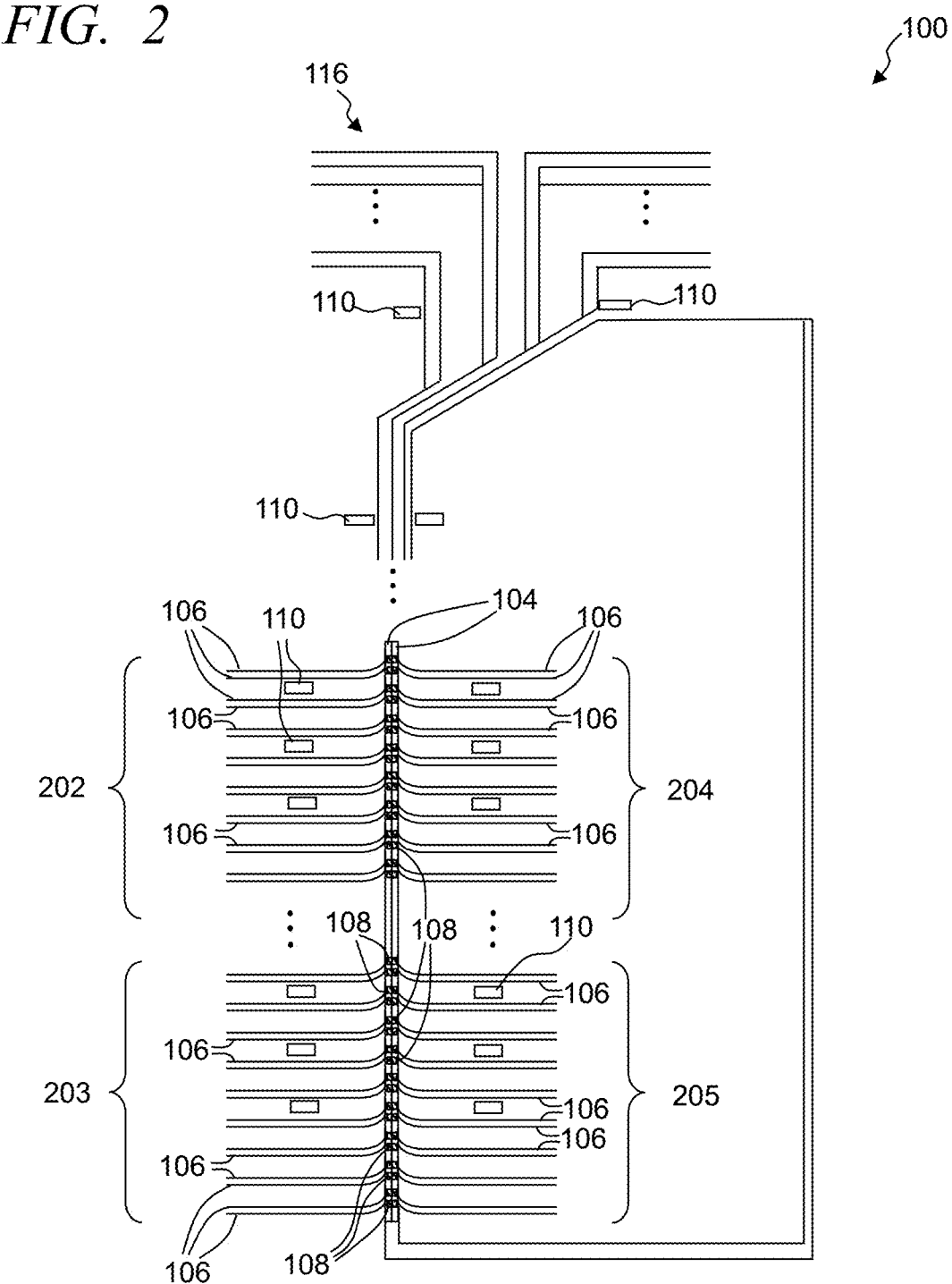
FIG. 2 illustrates an overhead view of exemplary conveyors of an exemplary product distribution conveyor system, in accordance with some embodiments.
Figure 3:
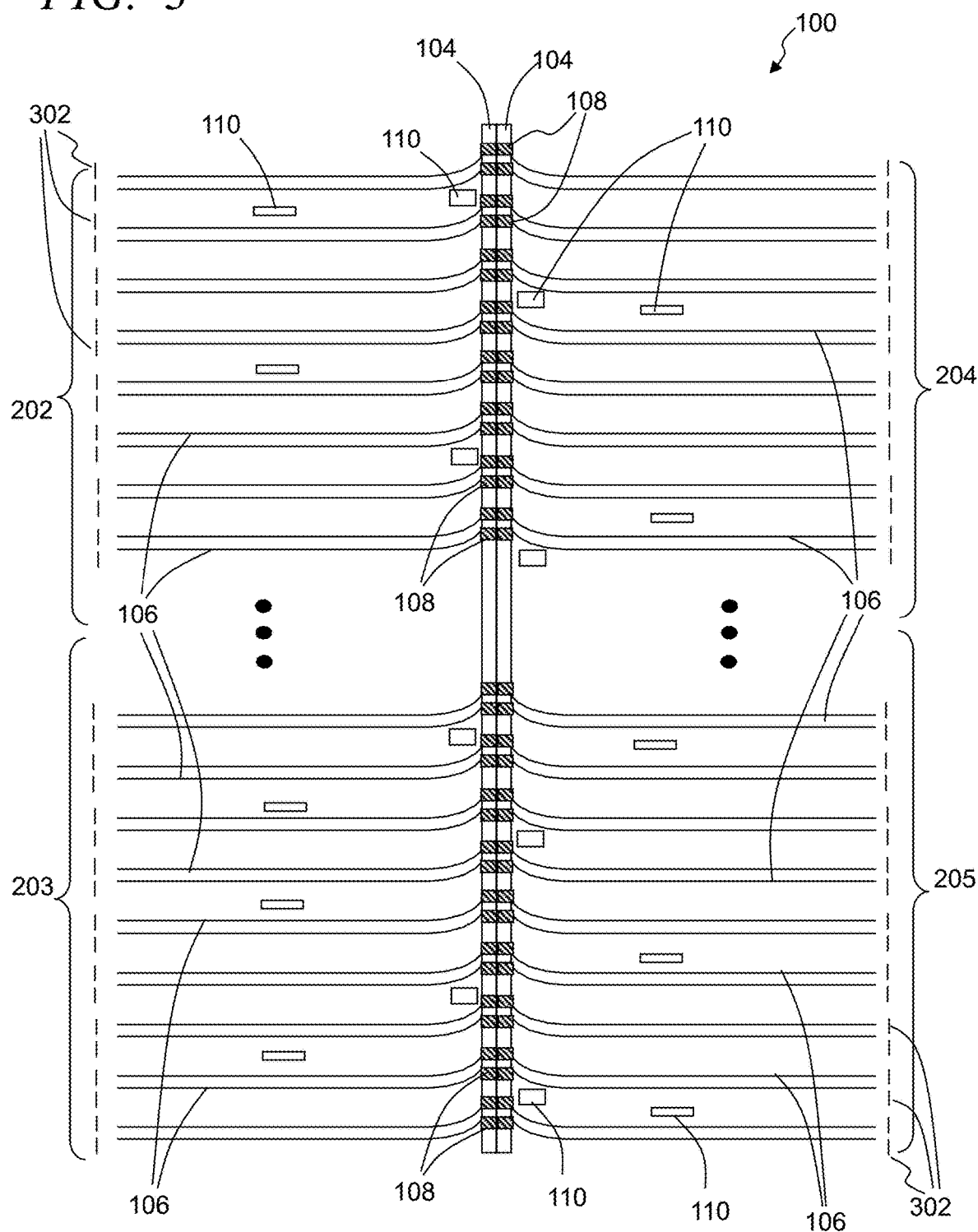
FIG. 3 illustrates an overhead view of at least a portion of an exemplary product feed conveyor systems cooperated with a plurality of exemplary conveyor lane systems, in accordance with some embodiments.
Figures 4, 5:
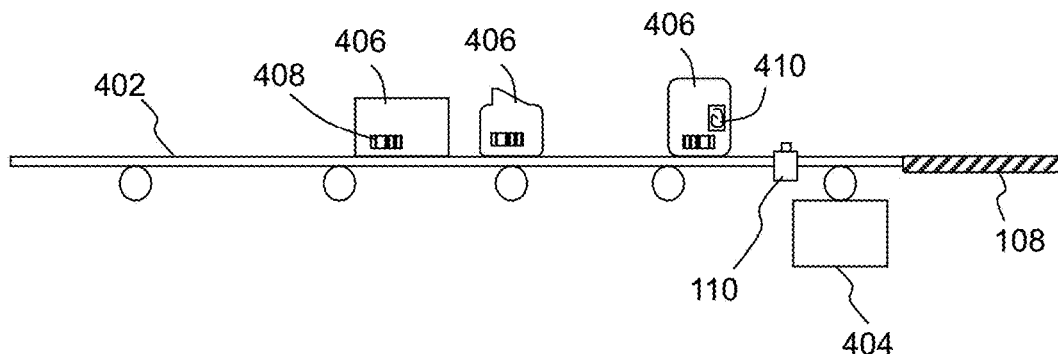
FIG. 4 illustrates a simplified block diagram, side view of a portion of an exemplary product feed conveyor system, in accordance with some embodiments.
FIG. 5 illustrates a simplified, exemplary distribution center designation graphical user interface (GUI), in accordance with some embodiments.

FIG. 2 illustrates an overhead view of exemplary conveyors of an exemplary product distribution conveyor system 100, in accordance with some embodiments. FIG. 3 illustrates an overhead view of at least a portion of exemplary product feed conveyor systems 104 cooperated with a plurality of exemplary conveyor lane systems 106, in accordance with some embodiments. FIG. 4 illustrates a simplified block diagram, side view of a portion of an exemplary product feed conveyor system 104, conveyor lane systems 106 and/or inbound conveyor systems 116, in accordance with some embodiments. Referring to FIGS. 1-4, a product distribution and/or fulfillment facility typically is configured to distribute products from the distribution facility to retail stores that have ordered products. As such, tens to hundreds of thousands of products or more are moved through the distribution facility daily and routed through the conveyor system to enable products to be collected for the different retail stores in preparation for loading into a delivery vehicle and transported to the intended retail store.

Products are moved from storage locations within the distribution facility and/or the inbound conveyor systems 116 to the feed conveyor system 104 that in turn transports the products to individual conveyor lane systems 106. Some embodiments associate or predefine the different conveyor lane systems 106 to be associated with a particular one or more of the retails stores. This, in part, enables delivery vehicles to be routed to the delivery bay door 302 corresponding to the predefined conveyor lane system 106. By applying one or more sets of rules the system can simplify the computational processing of tens to hundreds of thousands of potential product distribution allocations, while greatly improve the throughput of products through the product distribution conveyor system 100, reduce congestion within the conveyor systems and other benefits.

In some embodiments, the conveyor control circuit 102 accesses association rules and applies the association rules to associate each of the plurality of conveyor lane systems 106 with at least one of the plurality of different retail stores that order different quantities and/or volumes of products to be received from the distribution facility to, in part, balance and substantially equally distribute a total volume of flow of the products shipped from the distribution facility over the plurality of conveyor lane systems 106. This balanced distribution of the volume of product flow greatly enhances throughput of at least the feed conveyor system 104 and the conveyor lane systems 106.

Still referring to FIGS. 1-4, the one or more product feed conveyor systems 104 each include at least one feed conveyor upon which products are positioned during transport. The feed conveyor system can include one or more conveyor belts, rollers, wheels, array of rollers, array of wheels, motors, other such conveyor transport mechanisms or a combination of two or more of such conveyor transport mechanisms. In some implementations, different portions of the feed conveyor systems 104 are implemented through different types of conveyor transport mechanisms. As such, a single feed conveyor may include a single one of the conveyor transport mechanisms or a combination two or more of different types of conveyor transport mechanisms. Typically, the product feed conveyor systems 104 further includes one or more feed conveyor motor systems that drive one or more gears, rollers, wheels, bearings, other such drive mechanisms or a combination of two or more of such drive mechanisms to control the movement of the products being carried along by the feed conveyors. One or more of the feed conveyor motor systems are communicatively coupled with and controlled by the conveyor control circuit to implement movement and control of the feed conveyor to move products along the feed conveyor.

Each of the one or more feed conveyor systems is positioned to feed products to at least a subset of the plurality of conveyor lane systems 106 cooperated with and configured to receive products fed to the conveyor lane systems 106 from the feed conveyor system. In some embodiments, each of the conveyor lane systems 106 is associated with at least one bay door 302 of the distribution facility and through which products are loaded into delivery vehicles. Typically, an end of the conveyor lane system is positioned proximate the corresponding bay door enabling ready access between the conveyor lane system and a delivery vehicle parked at the corresponding bay door.

Each of the one or more product feed conveyor systems 104 and/or the plurality of conveyor lane systems 106 include at least one lane conveyor 402 along which products 406 are moved toward the bay door. In some implementations, one or more of the conveyor lane systems may include a loop that allows products, directed from one of the feed conveyor systems 104, to be moved around the loop while awaiting to be removed from the conveyor lane system 106 to be loaded into a delivery vehicle. The lane conveyors 402 of the feed conveyor systems 104 and/or conveyor lane systems 106 can include one or more conveyor belts, rollers, wheels, other such conveyor transport mechanisms or a combination of two or more of such conveyor transport mechanisms. In some implementations, different portions of the feed conveyor system and/or conveyor lane systems 106 are implemented through different types of conveyor transport mechanisms. As such, a single lane conveyor 402 may include a single one of the conveyor transport mechanisms or a combination two or more of different types of conveyor transport mechanisms. Further, one or more of the feed conveyor systems 104 and/or the conveyor lane systems 106 may include one or more conveyor motor systems 404 (e.g., lane motor system, feed motor system, etc.) that drive one or more gears, rollers, wheels, bearings, other such drive mechanisms or a combination of two or more of such drive mechanisms to control the movement of the products being carried along by the respective lane conveyor. One or more of the conveyor motor systems are communicatively coupled with and controlled by the conveyor control circuit to implement movement and control of the lane conveyor 402 of the one or more feed conveyor systems and/or the conveyor lane systems to move one or more of the products along the lane conveyor toward the respective conveyor lane system 106 and/or respective bay door 302.

The product distribution conveyor system 100 further includes a plurality of routing systems 108 as part of or cooperated with and distributed along the one or more feed conveyor systems 104 and/or one or more conveyor lane systems 106. The routing systems 108 are communicatively coupled with the conveyor control circuit 102. Each of the routing systems is controlled by the conveyor control circuit 102 and configured to cause the movement of respective products transported on the at least one feed conveyor system to a respective one of the conveyor lane systems 106 to direct intended products toward an intended bay door for the retail store that ordered that product. The routing systems 108 can include one or more of a turn-table and a motor that rotates the turn-table, guide arms and/or diverter that can extend, retract, rotate and/or perform other movements to direct and guide products onto and/or along intended conveyor lane systems, a multi-directional roller-top conveyor system or segment, retractable wheels or rollers or the like, ball table, controlled drop and/or lift ramp, push system (e.g., one or more rotatable rollers, balls or the like), other such routing systems or a combination of two or more of such routing systems that can be utilized and controlled to direct respective products to intended conveyors of the feed conveyor system 104 and/or the conveyor lane systems 106. In some embodiments, a routing system 108 is associated with each of the conveyor lane systems 106 to direct intended products from one or more of the feed conveyor systems 104 to the intended conveyor lane system 106. In some embodiments, the conveyor control circuit 102 track movement of products and communicates commands to the respective routing systems 108. In other implementations, the conveyor control circuit controls the routing systems 108 by in part communicating product identifier information for products that the respective routing system to change the direction of travel, and one or more sensor systems 110 can communicate product identifying information to a routing system control circuit and the routing system control circuit can control one or more routing systems 108 based on the product identifying information from a sensor matching product identifying information received from the conveyor control circuit.

In some embodiments, the plurality of sensor systems 110 are part of and/or are positioned adjacent the feed conveyor systems 104 and/or the conveyor lane systems 106. FIGS. 1-4 illustrate numerous different sensor systems 110. It will be appreciated that substantially any number of sensor systems 110 can be included in the product distribution conveyor system 100 and/or associated with one or more of the feed conveyor systems 104, the conveyor lane systems 106, the routing systems 108, the inbound conveyor systems 116 and/or other sub-systems of the product distribution conveyor system 100. In some embodiments, one or more sensor systems is positioned relative to each of the feed conveyor system 104, and each of the conveyor lane systems 106. Additionally or alternatively, some embodiments include one or more sensor systems 110 associated with each of the routing systems 108 and/or inbound conveyor systems 116. The sensor systems 110 can include optical scanner systems, bar code reader, a radio frequency identifier (RFID) tag reader systems, image capture systems, image processing and recognition systems, optical character recognition (OCR) systems, weight detection sensor systems, motion sensor systems, distance measurement sensor systems, speed detections sensor systems, dimension detection sensor systems, other such systems or a combination of two or more of such sensor systems. The sensor systems 110 are communicatively coupled with the conveyor control circuit 102 and/or other control circuit (e.g., a router system control circuit, a notification control circuit, a conveyor motor control circuit, etc.). At least some of the sensor systems 110 are configured to detect product identifying information of each product moved along a respective one of the feed conveyor or lane conveyor.

The product identifying information of each of the products can be communicated to the conveyor control circuit 102 (and/or other control circuit). Based on the product identifying information and known locations of sensors, the conveyor control circuit 102 can track the movements of and identify locations along the product feed conveyor systems 104 and/or the conveyor lane systems 106, and further control the product feed conveyor system 104, conveyor lane systems 106 and/or routing systems 108 based on the location of the products.

Through the control of the product feed conveyor systems 104, the conveyor lane systems 106 and the relevant routing systems 108, the conveyor control circuit can control the movement of each of the products onto an appropriate conveyor lane system associated with an intended retail store to receive the respective product. In some embodiments, the conveyor control circuit 102 can further confirm products are ordered by retail stores and intended to be delivered to retail stores. Further, the conveyor control circuit 102 confirms, as the products move along the one or more feed conveyor systems 104, the product identifying information of products as a product that is scheduled to be delivered to the intended retail store that ordered the product. Based on the product identifying information, the conveyor control circuit 102 can identify a conveyor lane system 106 associated with the intended retail store, and control the one or more feed conveyor systems, and one or more of the plurality of routing systems 108 to move the relevant product onto the identified conveyor lane system 106 associated with the intended retail store. The assigned correlation between the conveyor lane systems 106 and the respective one or more of the retail stores can be maintained in one or more databased accessible to the conveyor control circuit 102.

Further, the conveyor control circuit 102 can apply a set of one or more association rules to associate and predefine the conveyor lane systems 106 with a respective one or more of the retail stores to receive products. Accordingly, the conveyor control circuit 102 improves the performance of and enhances throughput of at least the one or more feed conveyor systems 104 by accessing the association rules and applying these association rules to associate each of the plurality of conveyor lane systems with at least one of the plurality of retail stores that order products to be received from the distribution facility such that a total volume of flow of the products shipped from the distribution facility is substantially equally distributed over the plurality of conveyor lane systems 106. In some embodiments, the conveyor control circuit, in applying the association rules, organizationally subdivides the plurality of conveyor lane systems to define a plurality of lane subdivisions 202-205. Further, the lane subdivisions 202-205 can, in some implementations, be divided to include substantially the same number of conveyor lane systems 106. The lane subdivision of the conveyor lanes can provide substantially any number of subdivisions. For example, there may be two lane subdivisions, four lane subdivisions (i.e., quadrants), six lane subdivisions, seven lane subdivisions, or other relevant lane subdivisions. In some applications, the number of lane subdivisions is defined at least in part based on a physical layout of the conveyor lane systems 106, defined at least in part based on a number of conveyor lane systems 106, by a user, other such factors, or a combination of such factors. Each lane subdivision 202-205 comprises a subsets of multiple conveyor lane systems 106 of the total number of the plurality of conveyor lane systems 106.

Based, in part, on the lane subdivisions 202-205, the conveyor control circuit in further applying one or more of the set of association rules further associates each retail store, of the plurality of retail stores that are to receive products from the distribution facility, with a respective one of the plurality of lane subdivisions 202-205 in an attempt to reduce or minimize deviations of subdivision volumes of products moved through each of the plurality of lane subdivisions. In some embodiments, a volume of products can be defined as a quantity of products and/or cases of products moved through one or more locations or areas during a predefined period of time. In other embodiments, the volume of products may be defined as a mass of products moved through one or more locations or areas during a predefined period. In yet other embodiments, the volume of products may be defined as a summation of volumes of the different products moved through one or more locations or areas during a period of time. Again, different stores receive different quantities of products and/or volumes of products. These differences can result in imbalances across the system, which can reduce efficiency, produce congestion and/or other adverse effects. Accordingly, in some embodiments, the subdivisions volumes of products correspond to total quantities of products that are moved through the respective subdivisions 202-205 of conveyor lane systems 106 during a period of time (e.g., work shift, work day, week, or other such period of time). By assigning retail stores according to subdivisions based on volumes of products, the subdivision volumes of products can be distributed to balance volumes of products routed through the respective portions of the feed conveyor systems 104 and conveyor lane systems 106 of the different subdivisions 202-205.

In some embodiments, the conveyor control circuit 102 in minimizing the deviations of the subdivision volumes of products moved through each of the plurality of lane subdivisions 202-205 is further configured to determine, for each day of a week that products are distributed through the distribution facility, a threshold or benchmark predicted subdivision product volume as a function of a total volume of the products to each of the subdivisions versus the number of lane subdivisions, and minimizing predicted deviations of the subdivision volumes from the benchmark predicted subdivision product volume for the days of the week the products are distributed through the distribution facility. This evaluation of total volume of the products can be determined based on historic product orders and/or product volume for different retail stores, based on future product volumes to be processed for a retail store, product volume trends for retail stores, other such information, or a combination of such information.

The conveyor control circuit 102, in some implementations, in applying the one or more of the set of association rules may apply unbalance minimization algorithms:

$$\sum_q x_{sq} = 1, \forall s \in S \tag{1}$$

such that one store can finally be assigned to only one subdivision;

$$\sum_s x_{sq} \leq N_q, \forall q \in Q \tag{2}$$

such that a number of stores assigned to each subdivision cannot exceed the maximum stores the subdivision can handle (for example, in some implementations, the number of stores s is greater than or equal to the number of conveyor lane systems of a subdivision);

$$\sum_q C_{si} x_{sq} - u_{iq} \leq \frac{1}{4} V_i (1 + \delta) \ \forall \ i \in I, q \in Q \tag{3}$$

$$\sum_q C_{si} x_{sq} + v_{iq} \geq \frac{1}{4} V_i (1 - \delta) \ \forall \ i \in I, q \in Q \tag{4}$$

$$0 \leq x_{sq} \leq 1, x_{sq} \text{ is integer} \ \forall \ q \in Q, s \in S \tag{5}$$

$$u_{iq} \geq 0, u_{iq} \text{ is integer} \ \forall \ i \in I, q \in Q \tag{6}$$

$$v_{iq} \geq 0, v_{iq} \text{ is integer} \ \forall \ i \in I, q \in Q; \tag{7}$$

where:
s=any one of the retail stores serviced by the distribution facility and is a set s ∈ S: set of selected stores;
$q_s$=an original or assigned lane subdivision (e.g., quadrant) to which store s has been assigned and is a set q ∈ Q: set of lane subdivisions;
i=a day of the week that the retail facility is operated and is a set i ∈ I: set of days;
$C_{si}$=a product volume to the store s on day i (e.g., a case volume ($C_{si}$) or volume of cases per day i routed through the retail facility to be delivered to the store s);

$N_q$=a maximum number of stores that can be assigned to a lane subdivision q;

$V_i$=a total product volume of all stores on day i, which in some instances is a case volume (e.g., $V_i=\Sigma_s C_{si}$); and δ=a benchmark or maximum percentage that a predicted subdivision product volume that can deviate from an average volume per subdivision.

In some embodiments, the following variables are applied for the above algorithms:

$$x_{sq} = \begin{cases} 1, & \text{if store } s \text{ is assigned to subdivision } q \\ 0, & \text{Otherwise} \end{cases};$$

$u_{iq}$=slack variable for constraint (3); and
$v_{iq}$=slack variable for constraint (4).

In some embodiments, the reassignment and/or realignment of retail stores to conveyor lane systems 106 and/or subdivisions 202-205 results in a cost to the distribution and/or fulfillment facility in at least labor and time. In some applications, for example, multiple different systems are further updated to ensure the correct products and/or cases are routed to a correct conveyor lane system for that moved store, as well as updating billing systems to ensure that the moved retail store is accurately billed and/or charged for each product, case, pallet, etc. that is routed to that moved retail store. Further, some embodiments utilize labels based on ordered products, and these labels need to accurately identify an intended conveyor lane system 106 for the retail store, and the system has to be updated in response to moving a retail store to a different conveyor lane system. Accordingly, the reassignment of stores to different conveyor lane systems can cause a complex process of corresponding changes and costs associated with implementing those changes. Thus, in some implementations, the assignment and/or reassignment of retail stores to subdivisions 202-205 and/or conveyor lane systems 106 may be implemented periodically (e.g., once a year, every half a year, every quarter of a year, or the like), in response to an override by an authorized worker, in response to detected imbalances between subdivisions greater than a threshold for more than a threshold period of time, in response to other such factors, or a combination of two or more of such factors).

Accordingly, some embodiments in applying the one or more of the set of association rules, further applies a cost balance minimization algorithm:

$$\min \sum_{q \neq q_s} P_s x_{sq},$$

where, $P_s$=a penalty or cost associated with assigning and/or reassigning that store s to a new lane subdivision 202-205.

Some embodiments, in applying the assignment rules and algorithms further limit and/or attempt to minimize changes in lane and/or subdivision reassignments in an attempt to reduce the cost associated with the conveyor lane system assignments to one or more retail stores. As such, assignment rules in balancing and reducing variations between lane subdivisions 202-205 can additionally be applied to further evaluate predicted subdivision volumes of products and/or lane product volumes relative to one or more benchmarks or thresholds such that some variation in product volumes between different subdivisions is considered acceptable, while the variations in product volumes cannot exceed one or more benchmarks (e.g., a benchmark deviation δ from an estimated and/or historic average total product volume of the one or more feed conveyor systems and/or the distribution relative to the number of lane subdivision 202-205, a threshold acceptance variation, or other such benchmark). For example, historic total product volumes can be averaged over a period of time (e.g., a month, multiple months, a year, multiple years, depending on available information). Similarly, this average may be limited to a particular day of the week, one or more threshold variations may be discarded (e.g., a volume standard deviation from an expected average, and/or other such variations), and/or other such actions may be applied to improve the predicted average. This average may be divided by a total number of lane subdivisions 202-205 to define an estimated average subdivision volume. Again, in some implementations, the average total product volume may be restricted by a day of the week, and subsequent estimated average subdivision volumes would similarly be specific to a day of the week.

The predicted subdivision volumes determined relative to different potential retail store to subdivision assignments can be evaluated relative to this benchmark in attempts to limit deviations of subdivision volumes from this benchmark to being within a threshold variation. Further, the minimized deviation can be evaluated for each day of a week that products are distributed through the distribution facility, in reducing or minimizing predicted deviations of the subdivision volumes from the benchmark predicted subdivision product volume for the days of the week. Accordingly, in some embodiments, the conveyor control circuit 102 in applying the set of association rules may limit the deviations of product volumes handled by each of the lane subdivisions 202-205, which in part, balances the flow of products to the different portions of the numerous conveyor lane systems 106. This balances through the conveyor system and lane subdivisions further enhances the operation of the conveyor system 100 by, in part, reducing congestion in the conveyor system, improving product flow through the conveyor system, and increasing the speed of distribution of products to relevant conveyor lane systems 106 in preparation for loading into appropriate delivery vehicles.

In addition to enhancing the balancing the product volumes across the multiple lane subdivisions 202-205, some embodiments further balance product volumes between different conveyor lane systems within a lane subdivision. Again, in some embodiments, the plurality of conveyor lane systems 106 are organizationally subdivided into the defined plurality of lane subdivisions 202-205, with each lane subdivision 202-205 having a subsets of multiple conveyor lane systems 106 of the total number of the plurality of conveyor lane systems 106. Accordingly, each lane subdivision includes multiple conveyor lane systems 106. Some embodiments further improve the conveyor system by applying one or more retail store assignment rules in assigning a particular retail store to a particular conveyor lane system 106 within the lane subdivision 202-205 with which the particular store has been assigned. This conveyor lane system assignment can further reduce congestion and improve the volume of product distribution and the speed of product distribution by, in part, attempting to provide some balance within the lane subdivision 202-205 and between conveyor lane systems 106 within the respective lane subdivision.

In some embodiments, the system can attempt to balance the product volume within each of the lane subdivisions based in part on product volume differences between two or more conveyor lane systems. Further, some embodiments consider product volumes and/or differences in product volumes between two or more neighboring conveyor lane systems 106. The conveyor control circuit 102 can be further configured to access one or more sets of retail store assignment rules and apply one or more of the retail store assignment rules to consider potential variations in assignments of retail stores to different conveyor lane systems of a subdivision in which the store has been associated. Additionally or alternatively, the application of the store assignment rules can evaluate the potential variations of assigning the plurality of retail stores previously associated to the particular lane subdivision to a respective conveyor lane system 106 in distributing the total volume of the products to further balance a distribution of each of the subdivision volumes of products across the subset of multiple conveyor lane systems of the respective subdivision. The distribution, in some applications, includes an attempt to minimize deviations of predicted product lane volumes, typical lane volumes, average lane volumes, other such product volume consideration or combination of two or more of such product volume consideration between multiple conveyor lane systems, and in some applications between at least pairs of neighboring conveyor lane systems of the respective subdivision. In some embodiments, the conveyor control circuit in assigning the retail stores to the respective conveyor lane system confirms, for each day of a week that products are distributed through the distribution facility, that an average lane volume of at least three neighboring lanes is within a first lane threshold difference of an average of the total volume of products per total number of the plurality of conveyor lane systems within the lane subdivision 202-205 being considered for store assignment.

Accordingly, some embodiments attempt to distribute the assigned retail stores across the respective lane subdivisions 202-205 in attempts to balance volumes of products between two or more neighboring lanes. This attempts to in part control and enhance the conveyor system and reduce congestion by attempting to achieve a relatively equal distribution of the quantities or volumes of products across the lane subdivision. The product volume distribution across the lane subdivision further improves the speed of distribution, and limits overburdening one or more areas of a respective lane subdivision 202-205, which can increase reliability of the lane subdivisions and respective conveyor lane systems 106, reduce maintenance, increase throughput and other such system benefits. The reduced congestion, increased reliability, reduced maintenance and other such system benefits can, in some instances, provide corresponding time and economic benefits.

In some embodiments, for example, the conveyor control circuit 102, after retail stores have been assigned to one of the lane subdivisions 202-205, can apply one or more store assignment rules through an iterative process to evaluate the assignment of combinations of retail stores to different ones of the respective lane subdivision for which the set of stores is assigned in attempts to reduce or minimize deviations between sub-groupings (e.g., two neighboring conveyor lane systems, three neighboring lane systems, etc.). The balance volume distribution can, in part, limit or avoid assigning two or more relatively large volume retail stores to neighboring conveyor lane systems 106, and other such benefits. For example, in some implementations, the conveyor control circuit 102 may apply one or more minimization deviation algorithms such as:

$$\sum_l x_{sl} = 1, \forall\, s \in S \qquad (8)$$

such that one conveyor lane system can finally be assigned to only one store (i.e., binary);

$$\sum_s x_{sl} = 1, \forall\, l \in L \qquad (9)$$

such that one store can finally be assigned to only one conveyor lane system (i.e., binary) within the respective subdivision that it has been assigned;

$$\sum_s c_{si} x_{sl} + \sum_s c_{si} x_{sl+1} - u_{il} \leq \frac{2V_i}{N}(1 + \delta)\ \forall\, i \in I, l \in L \qquad (10)$$

$$0 \leq x_{sl} \leq 1,\, x_{sl}\ \text{is integer}\ \forall\, l \in L, s \in S \qquad (11)$$

$$u_{il} \geq 0,\, u_{il}\ \text{is integer}\ \forall\, i \in I, lL \qquad (12)$$

where:
s=any one of the retail stores assigned to a subdivision 202-205 that is being evaluated and that is serviced by the distribution facility, which is a set $s \in S_q$: set of stores selected for the subdivision $q \in Q$;
l=a lane of the respective lane subdivision (e.g., quadrant) and is a set $l \in L$: set of lanes of the particular subdivision;
i=a day of the week that the retail facility is operated and is a set $i \in I$: set of days;
$C_{si}$=a product volume to the store s on day i (e.g., a case volume ($C_{si}$ or volume of cases per day i routed through the retail facility to be delivered to the store s);
N=a number of lanes in the lane subdivision q;
$V_i$=a total product volume of all stores on day i, which in some instances is a case volume (e.g., $V_i = Z_{s \in s_q} C_{si}$); and
δ=a benchmark or maximum percentage that a predicted average product volume for two adjacent conveyor lane systems can deviate from an average lane volume of the subdivision (e.g., sum of all volumes of all lanes divided by the total number of lanes in the subdivision). In some instances, the averages may be dependent on a day, and the average may be predicted based on historic data (e.g., past four weeks, past month, past three months, or some other relevant duration).

In some embodiments, the following variables are applied for the above algorithms:

$$x_{sl} = \begin{cases} 1, & \text{if store } s \text{ is assigned to lane } l \\ 0, & \text{Otherwise} \end{cases}$$

$u_{il}$=slack variable for constraint 10.

Some embodiments consider more than two neighboring lanes. For example, some embodiments consider three or more neighboring lines (e.g., a lane being considered in cooperation with lanes on both side of the lane being considered when there are lanes on both sides of the lane being considered). In some implementations, for example, the conveyor control circuit 102 may apply one or more minimization deviation algorithms relative to three neighboring lanes such as:

$$\sum_s C_{si}x_{sl} + \sum_s C_{si}x_{sl+1} + \sum_s C_{si}x_{sl+2} - v_{il} \leq \frac{3V_i}{N}(1+\theta) \quad (13)$$

$$\forall\ i \in I, l \in L$$

$$0 \leq x_{sl} \leq 1, x_{sl} \text{ is integer } \forall\ l \in L, s \in S \quad (10)$$

$$u_{il} \geq 0, u_{il} \text{ is integer } \forall\ i \in I, l \in L \quad (12)$$

$$v_{il} \geq 0, v_{il} \text{ is integer } \forall\ i \in I, l \in L \quad (14)$$

In some embodiments, the following variables are applied for the above algorithms:

$$x_{sl} = \begin{cases} 1, & \text{if store } s \text{ is assigned to lane } l \\ 0, & \text{Otherwise} \end{cases}$$

$u_{il}$=slack variable for constraint 10
$v_{il}$=slack variable for constraint 13; and
θ=a benchmark or maximum percentage threshold that a predicted average product volume for three adjacent conveyor lane systems can deviate from an average lane volume of the subdivision (e.g., sum of all volumes of all lanes divided by the total number of lanes in the subdivision). In some instances, the averages may be dependent on a day, and the average may be predicted based on historic data (e.g., past four weeks, past month, past three months, or some other relevant duration).

By applying the store assignment rules, some embodiments identify a conveyor lane system 106, within the lane subdivision 202-205 that each retail store assigned to the particular lane subdivision, is assigned (i.e., $x_{sl}$) as a function of the product volumes predicted for different stores, and in attempts to balance product volume loads over the lane subdivision 202-205. Some embodiments further limit neighboring conveyor lane system assignments as a function of the average historic product volume for the lane subdivision, which also may be limited based on a particular day, and/or other such factors.

The assignment of retail stores to lane subdivisions 202-205 and/or conveyor lane systems 106 can be implemented daily, multiple times a day, weekly, monthly, quarterly, or other such time frame. Again, in some implementations, the reassignment and/or realignment of retail stores to conveyor lane systems 106 and/or subdivisions 202-205 can be accompanied by cost to the distribution facility and/or fulfillment facility. As such, in some embodiments, the implementation of the assignment and/or reassignment of retail stores to lane subdivisions and/or conveyor lane systems 106 may be limited (e.g., once a year, every half a year, every quarter of a year, or the like), in response to an override by an authorized worker, in response to detected imbalances between subdivisions greater than a threshold for more than a threshold period of time, in response to other such factors, or a combination of two or more of such factors). Similarly, in some implementations, the assignment and/or reassignment of retail stores to lane subdivisions and/or conveyor lane systems 106 is manually initiated by a user, while in other instances, the assignment and/or reassignment may be automatically initiated in response to a threshold deviation between subdivisions and/or neighboring lanes, a threshold number of deviations greater than a threshold deviation within a threshold period of time, or other such initiation conditions. Still other embodiments activate the assignment and/or reassignment of retail stores to lane subdivisions and/or conveyor lane systems 106 based on a time schedule.

Further, because of the potential cost to reassign retail stores to the lane subdivisions 202-205 and/or conveyor lane systems 106, some embodiments in applying the one or more of the set of store assignment rules, further applies one or more lane cost balance minimization algorithms. For example, some embodiments apply a lane cost balance minimization algorithm similar to:

$$\min \sum_s \sum_{l \neq l_s} P_s x_{sl} + \sum_i \sum_l P_u u_{il} + \sum_i \sum_l P_v v_{il}$$

where,
$P_s$=a penalty or cost associated with assigning and/or reassigning a first store s to a conveyor lane system 106;
$P_u$=a penalty or cost associated with assigning and/or reassigning a second store u to a first neighboring conveyor lane system 106; and
$P_v$=a penalty or cost associated with assigning and/or reassigning a third store v to a second neighboring conveyor lane system 106.

Still referring to FIGS. 1-4, in some embodiments, the product distribution conveyor system 100 further include one or more scheduling control circuits 122 that are communicatively coupled with the one or more conveyor control circuits 102, the one or more databases 114 (e.g., rules database, store orders database, scheduled and/or predicted volume database, worker database, other such databases, and typically a combination of two or more of such databases), and/or other components of the product distribution conveyor system 100, through direct wired and/or wireless communication coupling through the one or more communication and/or computer networks 112. The scheduling control circuit, in part, is configured to further enhance the product distribution conveyor system 100 through the assignment and/or allocation of each of multiple workers to one or more conveyor lane systems 106 and/or correspondingly assigned retail stores in order to retrieve products from the respective conveyor lane systems 106 in preparation for and/or in loading delivery vehicles with the products to be transported to the intended retail store. The schedule control circuit can, in some embodiments, utilize the known or expected product volume to be directed to the respective conveyor lane systems 106, and assign each of one or more workers to one or more conveyor lanes.

Some embodiments include one or more volume prediction systems 124 communicatively coupled with the one or more conveyor control circuits 102, the one or more databases 114 (e.g., rules database, store orders database, scheduled and/or predicted volume database, worker database, other such databases, and typically a combination of two or more of such databases), and/or other components of the product distribution conveyor system 100, through direct wired and/or wireless communication coupling through the one or more communication and/or computer networks 112. The volume prediction system can evaluate, for each of the plurality of retail stores, historic volumes for each day of the week that products are distributed through the distribution facility and determine a predicted volume of products per day predicted to be distributed to the respective retail store. Similarly, a predicted total volume of the products distributed from the distribution facility for a given day can be determined as a sum of the product volumes per store.

The one or more of the databases 114 may store the association of each of the plurality of conveyor lane systems 106 to a respective one of the plurality of retail stores, the corresponding predicted volume of products per day predicted to be distributed to the respective retail store, the total volume of the products to be distributed from the distribution facility per day, and other such information.

In some embodiments, the scheduling control circuit 122 accesses one or more sets of worker assignment and/or scheduling rules in one or more rules databases, and product information in a products database to obtain and/or access total predicted or scheduled volume of the products for the distribution facility for a current day. The schedule control circuit can apply the scheduling rules to schedule each of a plurality of workers to one or more conveyor lane systems 106 of the plurality of conveyor lane systems as a function of the assigned retail stores to the plurality of conveyor lane systems and the respective volume of products for the respective store, and to balance workloads of the plurality of workers as a function of predict lane volumes for the current day for the retail stores assigned to the respective conveyor lane systems. The balancing of the workloads for the different workers is typically dependent on a number of workers that are available on a given day. Further, the balancing of workloads is also dependent on volumes of products to be transported by the respective conveyor lane systems.

The scheduling control circuit 122, in some implementations, access the total volume of the products for a current day of the week and a total number of workers available for the current day, and determines a threshold or benchmark average volume per worker as a function of the total volume of the products and the total number of workers available. Some embodiments determine this benchmark daily, while other embodiments may determine a benchmark weekly, monthly, based on predicted numbers of workers, or other condition. The scheduling control circuit can apply the scheduling rules to evaluate different combinations of conveyor lane systems as a function of corresponding predicted lane volumes, and assign each worker to one or more of the conveyor lane systems in minimizing standard deviations of a summation of predicted lane volumes, of the one or more conveyor lane systems to be assigned to the respective worker, from the benchmark average volume per worker. In some embodiments, the scheduling control circuit applies a heuristic evaluation and/or enumeration approach to evaluate different combinations of assigned one or more conveyor lane systems to the number of available workers. Some embodiments further apply one or more restrictions, such as restricting distances between conveyor lane systems assigned to a single worker, preventing conveyor lane assignments when a sum of product lane volumes for multiple conveyor lane systems assigned to a single worker exceeds a volume threshold, restricting conveyor lane assignments for a single worker to conveyor lane systems that are within a single one of the lane subdivisions 202-205, applying prioritization for conveyor lane assignments that are neighboring lanes and/or within a threshold number of conveyor lanes, and/or other such conditions and restrictions.

In some embodiments, the scheduling control circuit 122 restricts conveyor lane assignments to a given subdivision. As such, the scheduling control circuit can divide the total number of workers available for the current day by the number of lane subdivisions to obtain a subdivision number of workers. A subdivision of total volume of the products for a current day of the week for a respective land subdivision can be accessed by the scheduling control circuit, and a subdivision benchmark average volume per worker can be determined as a function of the subdivision total volume of the products and the subdivision total number of workers available. The scheduling control circuit can apply the scheduling rules to evaluate different combinations of conveyor lane systems within the respective lane subdivision as a function of corresponding predicted lane volumes, and assign the subdivision of worker to one or more of the conveyor lane systems within the lane subdivision in minimizing standard deviations of a summation of predicted lane volumes, of the one or more conveyor lane systems to be assigned to the respective worker, from the subdivision benchmark average volume per worker.

In some applications, the scheduling control circuit 122 receives the total number of workers based on the workers checking in to work (e.g., through a time clock system), entered by a supervisor, and/or other such methods. Further, the scheduling control circuit 122 can enable access to one or more assignment graphical user interfaces through a user computing device 126, display system and/or user interface. The user computing device may be a computer, smartphone, tablet, laptop, other distribution facility specific device, or other such computing device that includes a display and a user interface to allow the user (e.g., worker, supervisor, etc.) to gain access to the one or more graphical user interfaces. Further, the user computing devices can be configured to be communicatively coupled with at least the scheduling control circuit 122, and typically one or more of the scheduling control circuit 122, the conveyor control circuit 102, databases 114, volume prediction system 124, other user computing devices, and/or other components of the system through direct coupling or via the network 112.

In some implementations, a graphical user interface (GUI) enables a user to enter a number of available workers, and an identifier of the distribution facility when this information is not already provided to the scheduling control circuit 122. Based on the identified distribution facility, the scheduling control circuit 122 is configured to access specifications for the identified distribution facility. This specification information can include identifiers of each of the plurality of conveyor lane systems and identifiers of each of the retail stores that are to receive products from the identified distribution facility at least for a given day for which workers are being assigned to one or more of the conveyor lane systems. As described above, the scheduling control circuit 122 can evaluate the volumes of products and assign each worker to one or more of the conveyor lane systems 106 and/or respective retail stores. Further, the scheduling control circuit can communicate, to one or more of the user computing devices, the assignments of the workers to the respective conveyor lane systems to be displayed, such as through one or more of the graphical user interfaces. Typically, a user would have to log-in to the system to gain access to and/or implement actions such as retail store assignments to a lane subdivision and/or one or more of the conveyor lane systems, the reassignment of retail stores to a lane subdivision and/or one or more of the conveyor lane systems, the assignment of workers to one or more of the conveyor lane systems, and/or other such actions. Similarly, in some embodiments, the graphical user interface may provide a user with an option to select a mode or action to be initiated (e.g., retail store alignment and/or assignment to a lane subdivision; alignment of retail stores to conveyor lane systems; scheduling of workers and/or assigning workers to one or more conveyor lane systems; and/or other such actions).

FIG. 5 illustrates a simplified, exemplary distribution center designation GUI 500, in accordance with some embodiments. The designation GUI 500 enables a user to specify a distribution center that is to be evaluated, workers to be assigned to conveyor lane systems, stores to be assigned or reassigned to conveyor lane systems or other such actions. In some embodiments, the designation GUI 500 includes a distribution center identifier field 502 that allows the user to enter one or more identifiers (e.g., a distribution center number, a distribution center name, etc.) of a distribution center. In some implementations, the designation GUI may provide information about the distribution center identified (e.g., name, location, building type (Bld type), number of lanes previously scheduled, number of lanes closed, number of workers or associated currently available and/or available in a previous work day, other such information, or a combination of such information.

FIG. 6 illustrates a simplified, exemplary assignment GUI 600, in accordance with some embodiments. The assignment GUI 600 enables a user to enter a number of associates/workers that are available through an associate number field 602. Further, some embodiments include a lane configuration field 604 that enables a customer to provide conveyor lane system information and/or other conveyor information about the distribution center being evaluated. In some implementations, the assignment GUI 600 may further provide information about the distribution center identified (e.g., name, location, building type (Bld type), number of lanes previously scheduled, number of lanes closed, number of workers or associated currently available and/or available in a previous work day, other such information, or a combination of such information.

Figure 7:
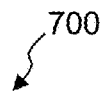
FIG. 7 illustrates a simplified, exemplary subdivision allocation GUI, in accordance with some embodiments.

FIG. 7 illustrates a simplified, exemplary subdivision allocation GUI 700, in accordance with some embodiments. The subdivision allocation GUI 700 provides the user with information about the assignment of retail stores to the different lane subdivisions 202-205 (e.g., "Subdiv. #"). In some instances, the subdivision allocation GUI 700 may further identify conveyor lane system assignments (e.g., "Lane #") to which different stores are assigned. The subdivision allocation GUI 700 may further identify previous and updated or reassigned stores to conveyor lane system assignments. Some embodiments further identify the number of conveyor lane systems per subdivision, and an allocation of percentage of total product volume of the distribution center that is to be directed through the different lane subdivisions. It is noted that the illustrated exemplary subdivision allocation GUI 700 shows four subdivisions, however, the number of subdivisions is not restricted to four and instead can be substantially any relevant number depending on one or more factors (e.g., physical layout of the distribution center, physical layout of the conveyor lane systems, number of conveyor lane systems, product volume, other such factors, and in some instances a combination of such factors).

Figure 8:
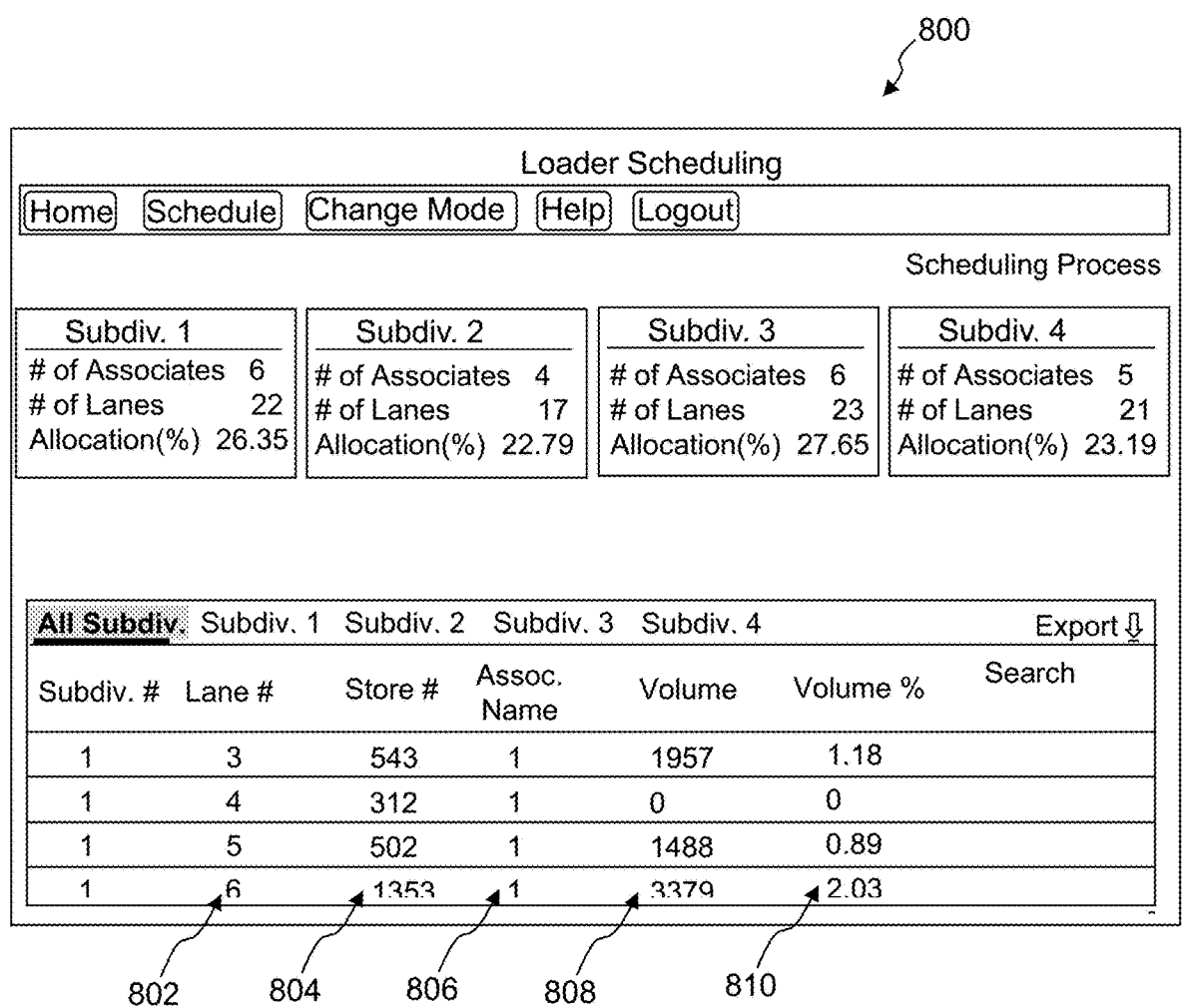
FIG. 8 illustrates a simplified, exemplary associate assignment GUI, in accordance with some embodiments.

FIG. 8 illustrates a simplified, exemplary associate assignment GUI 800, in accordance with some embodiments. The associated assignment GUI 800 provides the user with information about the association 802 of conveyor lane systems (e.g. "Lane #") to a respective one of the lane subdivisions (e.g., "Subdiv. #"), assignments 804 of retail stores to respective one or more of the conveyor lane systems, and worker or associate conveyor lane system assignments 806. This may be indicated based on a worker number of a worker, a worker's name, or other distinguishing identifier of the worker. Some embodiments may further identify a volume of product 808 expected to be processed through the respective conveyor lane system, which may be limited to a single day of interest, an average for a particular day of the week, an average over a week, or the like. Similarly, some embodiments may provide a percentage of the total product volume 810 expected through the distribution facility, which may be limited to a single day of interest, an average for a particular day of the week, an average over a week, or the like; and/or a total product volume expected through that lane subdivision. In some implementations, the associate assignment GUI 800 may further identify lane subdivision information about some or all of the lane subdivisions, such as but not limited to number of associated assigned to the different lane subdivisions; a number of conveyor lane systems of the lane subdivision, and/or a number of active and assigned conveyor lane systems of the subdivision; a percentage of total product volume to be routed through the respective lane subdivisions; other such information; and in some instances a combination of such information.

Figure 9:
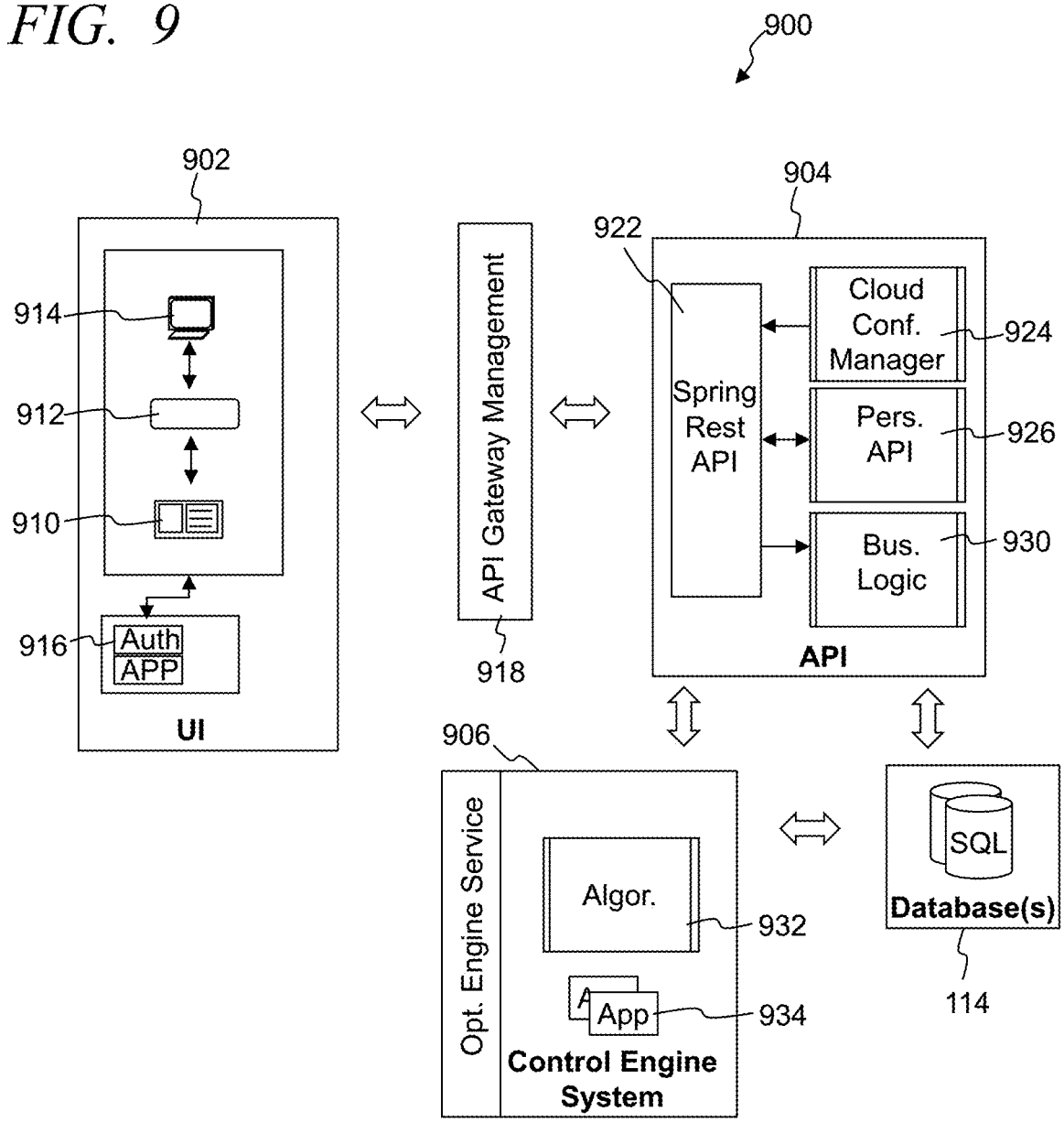
FIG. 9 illustrates a simplified block diagram of an exemplary conveyor control system to provide control over a distribution facility conveyor system, in accordance with some embodiments.

FIG. 9 illustrates a simplified block diagram of an exemplary conveyor control system 900 to provide control over a distribution facility conveyor system, in accordance with some embodiments. The conveyor control system 900 can be implemented through one or more computer systems, servers, portable computing devices (e.g., laptop, smartphone, tablet, etc.), memory and/or databases communicatively coupled over a computer and/or communication network. In some applications, the computers, servers, portable computing devices, memory, databases and/or other components of the conveyor control system can be geographically distributed over the network, such as over the Internet. The conveyor control system 900 includes a user interface system 902, an application program interface (API) system 904, a control engine system 906, one or more databases 114. In some embodiments, some or all of the user interface system 902, the application program interface (API) system 904, and the control engine system 906 can be implemented through the one or more conveyor control circuits 102.

The user interface system 902 typically includes an interface application 910 that is activated by a user through a user interface 912. In some implementations, the user interface further includes and/or interfaces with an Internet browser and/or browser application 914. The interface application 910 enables a user to access graphical user interfaces, acquires information from users, communicates some or all of that information over the network to one or more of the API system 904 and/or the conveyor control system, receives information from one or more of the API system 904 and/or the conveyor control system, provides information to the user, and other such functionality. Further, the user interface system 902 typically includes and/or provides access to an authentication application 916 (e.g., single-sign-on authentication). The user interface system 902 can be one or more desktop computers, servers, portable computing devices (e.g., laptop, smartphone, tablet, etc.), other such relevant computing devices, or a combination of two or more of such computing devices.

In some embodiments, the user interface system 902 communicates through one or more API gateway management systems 918 that can create and publish web application programming interfaces (APIs), enforce usage policies, control access to the API system 904 and/or the control engine system 906, collect and analyze usage statistics, report on performance, and/or provide other such functionality. The API system 904 provides one or more APIs to control the flow of data, access to data, and enable the activation of processing. The API system 904 may be implemented through one or more software platforms (e.g., JAVA™ APACHE™ etc.). For example, some implementations include a spring REST API 922, a cloud or Internet confirmation manager API 924, a Java persistence API 926, a business logic API 928, other such APIs, and typically a combination of two or more of such APIs. In some embodiments, one or more of the APIs of the API system 904 have direct access to one or more databases 114, while other APIs interface with the user interface system 902 and/or the control engine system 906.

In some embodiments, the control engine system 906 implements one or more of the processes and/or processing to control one or more of the product feed conveyor system 104, the inbound conveyor systems 116, the plurality of conveyor lane systems 106, the plurality of routing systems 108, the plurality of sensor systems 110, and other components of the product distribution conveyor system 100. This can include, in some embodiments, the implementation of one or more of the above or below described algorithms 932 and/or other relevant processing and/or control applications 934.

Figure 10:
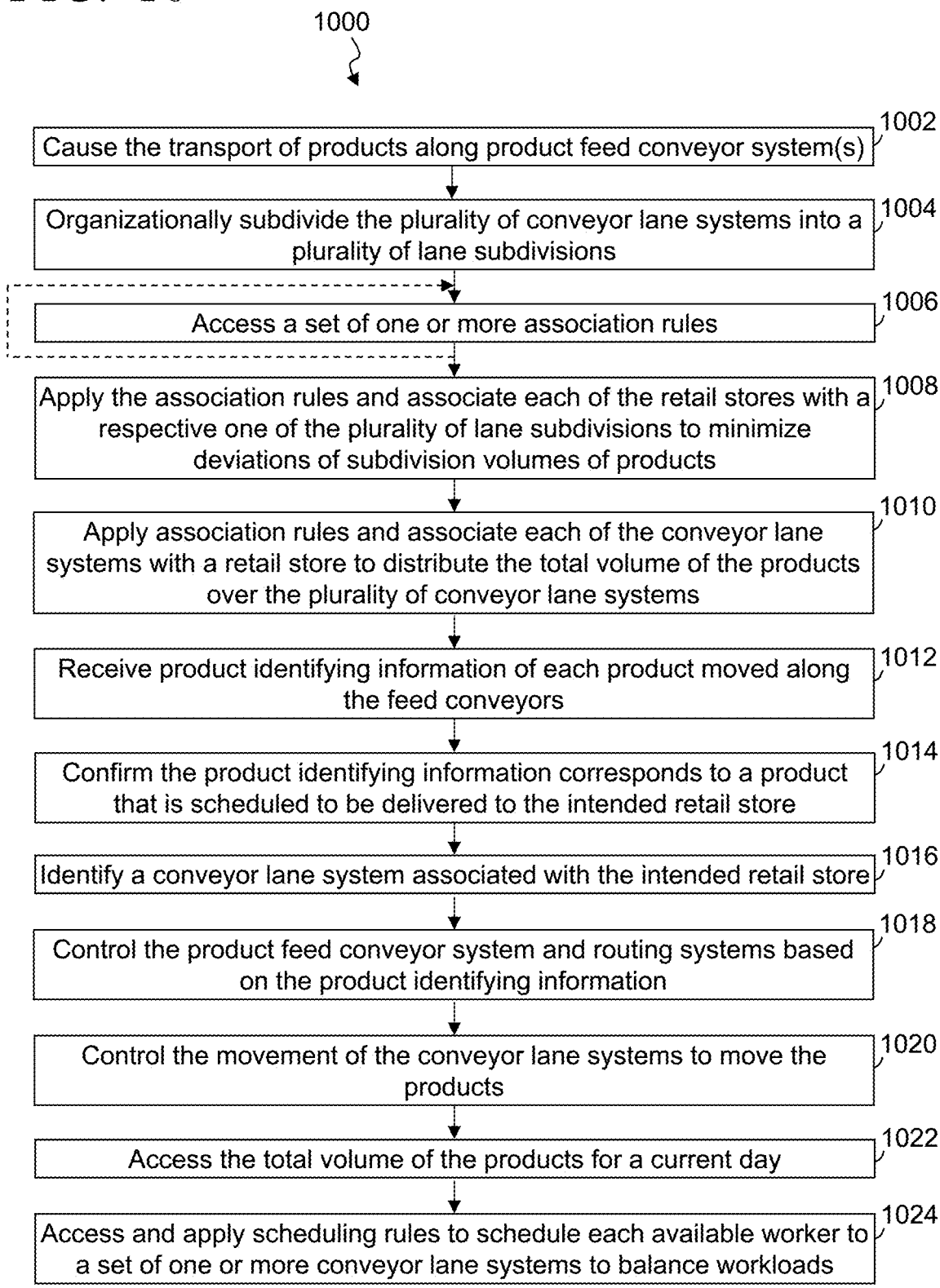
FIG. 10 illustrates a simplified flow diagram of an exemplary process of controlling conveyor systems of the product distribution conveyor system, in accordance with some embodiments.

FIG. 10 illustrates a simplified flow diagram of an exemplary process 1000 of controlling conveyor systems of the product distribution conveyor system 100, in accordance with some embodiments. In step 1002, the one or more conveyor control circuits 102 enable and/or cause the transport of thousands, and typically tens to hundreds of products along at least one product feed conveyor system 104. In some implementations, the feed conveyor systems include at least one feed conveyor 402 and multiple feed conveyor motor systems that are communicatively coupled with and controlled by at least one of the conveyor control circuits 102 to implement movement and control of the feed conveyor to move the products along the feed conveyor and to respective ones of a plurality of conveyor lane systems 106 that are cooperated with at least one of the one or more of the feed conveyor system 104. Again, the conveyor lane systems 106 are configured to receive products fed to the conveyor lane systems from the feed conveyor system. As described above and further below, each of the conveyor lane systems 106 is predefined to be associated with at least one bay door 302 of the distribution facility and through which products are loaded into delivery vehicles. In some embodiments, one or more of the plurality of conveyor lane systems 106 includes at least one lane conveyor 402 and at least one conveyor motor 404 communicatively coupled with and controlled by the conveyor control circuit 102.

In step 1004, the plurality of conveyor lane systems are organizationally subdivided to define a plurality of lane subdivisions 202-205. Each of the lane subdivisions 202-205 comprise a subsets of multiple conveyor lane systems 106 of the plurality of conveyor lane systems 106. In step 1006, access a set of one or more association rules to control and enhance throughput of the at least one feed conveyor system 104. In step 1008, one or more of the one or more association rules are applied and each retail store, of a plurality of different retail stores that order products to be received from the distribution facility, are associated with a respective one of the plurality of lane subdivisions 202-205 to minimize deviations of subdivision volumes of products moved through each of the plurality of lane subdivisions 202-205. In step 1010, the association rules are further applied and each of the plurality of conveyor lane systems 106 is associated with at least one of the plurality of retail stores such that a total volume of the products shipped from the distribution facility is substantially equally distributed over the plurality of conveyor lane systems.

In step 1012, product identifying information is received of each product moved along the feed conveyors of the one or more product feed conveyor systems 104 from one or more of a plurality of sensor systems 110. At least some of the sensor systems can be positioned adjacent one or more of the feed conveyors of the product feed conveyor systems 104 and the lane conveyors of the conveyor lane systems 106. Some embodiments may include other sensor systems that are not positioned adjacent a conveyor, such as but not limited to remote camera systems, portable sensor systems carried by works and/or transported by motorized manned and/or unmanned vehicles, temporarily placed sensor systems, other such sensor systems, or a combination of such sensor systems. At least some of the sensor systems 110 can provide product identifying information of each product moved along one or more of the feed conveyors and/or the lane conveyors. In some instances, the conveyor control circuit 102 receives the product identifying information of each of the products communicated from the sensor systems 110. One or more of the sensor systems, for example, can include bar code scanner systems and/or bar code readers that captures bar code identifying information through one or more bar codes 408 on the products, radio frequency identifier (RFID) tag readers configured to wirelessly detect and receive RFID product identifying information from one or more RFID tags 410 fixed with the respective products, image capture systems and image processing systems that capture and process images to identify product identifying information (e.g., image recognition, text capture, shape detection, other such image processing, or combination of such image processing), weight sensor systems detecting weights of products transported by the product feed conveyor systems 104 and/or the conveyor lane systems 106, other such sensor systems, or a combination of such sensor systems.

In step 1014, the product identifying information is confirmed, as the product moves along the product feed conveyor system 104, as a product that is scheduled to be delivered to the intended retail store that ordered the product. In step 1016, a conveyor lane system 106 is identified that is associated with the intended retail store. In some embodiments, the conveyor control circuit 102 accesses an orders and/or inventory database that maintains records of products ordered by different retail stores. The database can be searched based on the product identifying information to identify and/or confirm the ordered product has been ordered by a retail store to be routed during a current day. In step 1018, the product feed conveyor system 104 and one or more of the plurality of routing systems 108 that are cooperated with the feed conveyor are controlled, based on the product identifying information for each of the products, to move each of the respective products along the product feed conveyor system and move the respective products by the routing systems onto an appropriate conveyor lane system 106 of the plurality of conveyor lane systems associated with an intended retail store to receive the respective product. In step 1020, the movement of the lane conveyor of the respective conveyor lane system 106 is controlled to move the products received from the feed conveyor system 104 along the lane conveyor toward the respective bay door 302.

In step 1022, the total volume of the products for a current day are accessed, for example through a product order database, historic data, other such information, or a combination of such information. In step 1024, scheduling rules are accessed and applied, and each of a plurality of workers is scheduled or assigned to one or more conveyor lane systems 106 of the plurality of conveyor lane systems as a function of the assigned retail stores to the plurality of conveyor lane systems and to balance workloads of the plurality of workers as a function of predict lane volumes for the current day for the retail stores assigned to the respective conveyor lane systems. It is noted that one or more of the steps and/or a subset of set may be repeated through an iterative and/or heuristics process.

Figure 11:
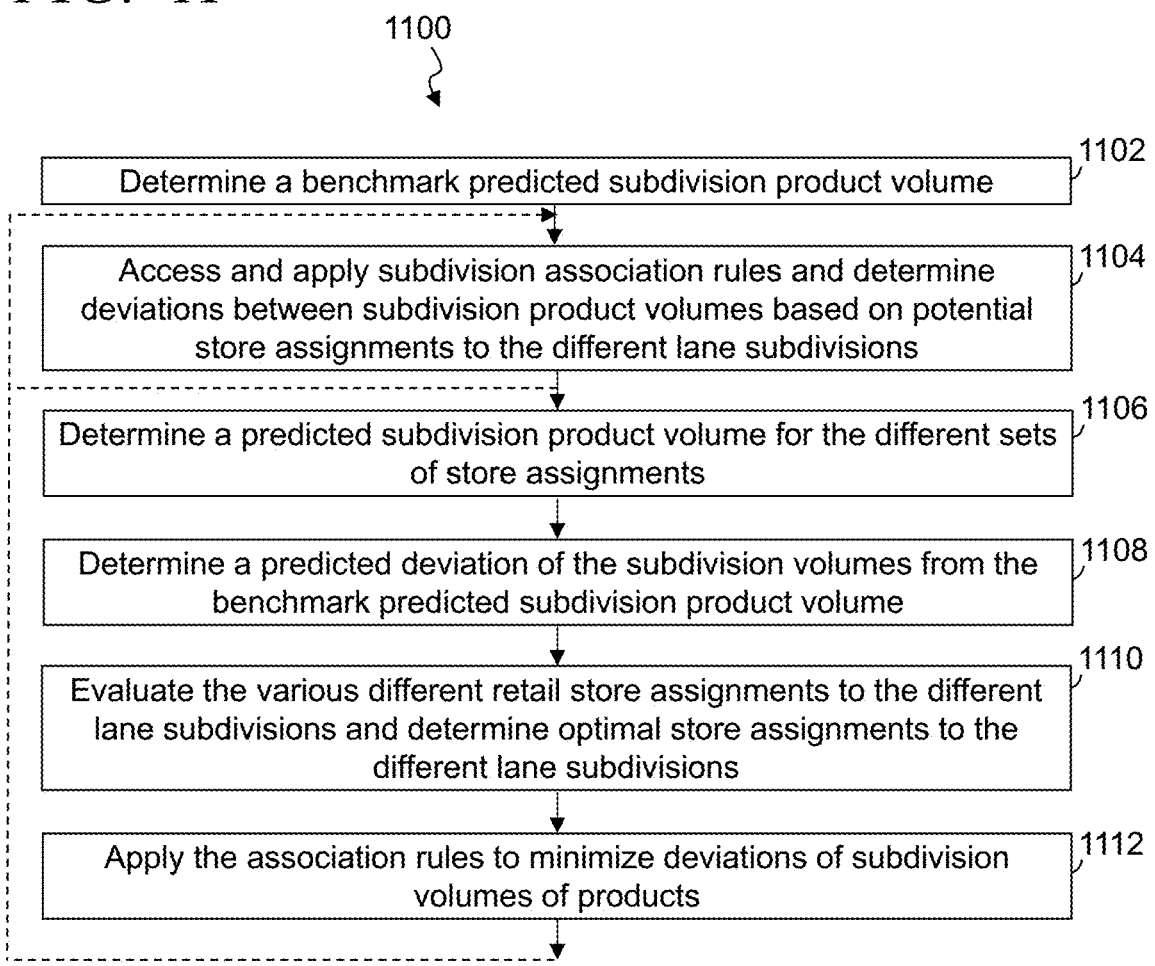
FIG. 11 illustrates a simplified flow diagram of an exemplary process to minimize deviations of subdivision volumes of products moved through each of the plurality of lane subdivisions, in accordance with some embodiments.

FIG. 11 illustrates a simplified flow diagram of an exemplary process 1100 to minimize deviations of subdivision volumes of products moved through each of the plurality of lane subdivisions 202-205, in accordance with some embodiments. This minimization process 1100 can be used, in some implementations, as at least part of step 1006 of the control process 1000. In step 1102, a benchmark predicted subdivision product volume is determined as a function of a total volume of the products processes through the product distribution conveyor system 100 versus a number of lane subdivisions 202-205. The prediction may be based on ordered products, historic orders, a predicted maximum number of total product volume that can be handled by the product distribution conveyor system, other such factors, or a combination of two or more of such factors.

In step 1104, the subdivision association rules are applied and an iterative process is performed where the stores are temporarily associated with different ones of the lane subdivisions 202-205, and based on historic orders (e.g., average product volume for a store based on four months of orders), the deviations between subdivision product volumes between are determined for the different potential assignments of the different stores to the different lane subdivisions, and a set of different potential store assignments to different subdivisions are obtained. In step 1106, a predicted subdivision product volume is determined for the different sets of store assignments. This subdivision product volume may be an average volume over multiple days, may be an average for a day of the week determined over multiple weeks and/or months, may be an estimate for a particular date and day of the week, or other such predicted product volume. In some instances, for example, the predicted volume is an average over multiple weeks for a particular day of the week.

In step 1108, a predicted deviation is determined of the subdivision volumes from the benchmark predicted subdivision product volume, and typically determined for the respective days of the week the products are distributed through the distribution facility. This process 1100 can be repeated for the potential different assignments of retail stores to different ones of the lane subdivisions. In step 1110, the various different retail store assignments to the different lane subdivisions 202-205 are evaluated to determine optimal store assignments to the different lane subdivisions. In some implementations, the system attempts to minimize deviations of subdivision volumes of products between the different lane subdivisions based on the different potential assignments of retail stores to the lane subdivisions. Further, in some implementations, the process 1100 optionally includes step 1112 where one or more of the one or more association rules are applied and each retail store, of a plurality of different retail stores that order products to be received from the distribution facility, are associated with a respective one of the plurality of lane subdivisions 202-205 to minimize deviations of subdivision volumes of products moved through each of the plurality of lane subdivisions 202-205.

Figure 12:
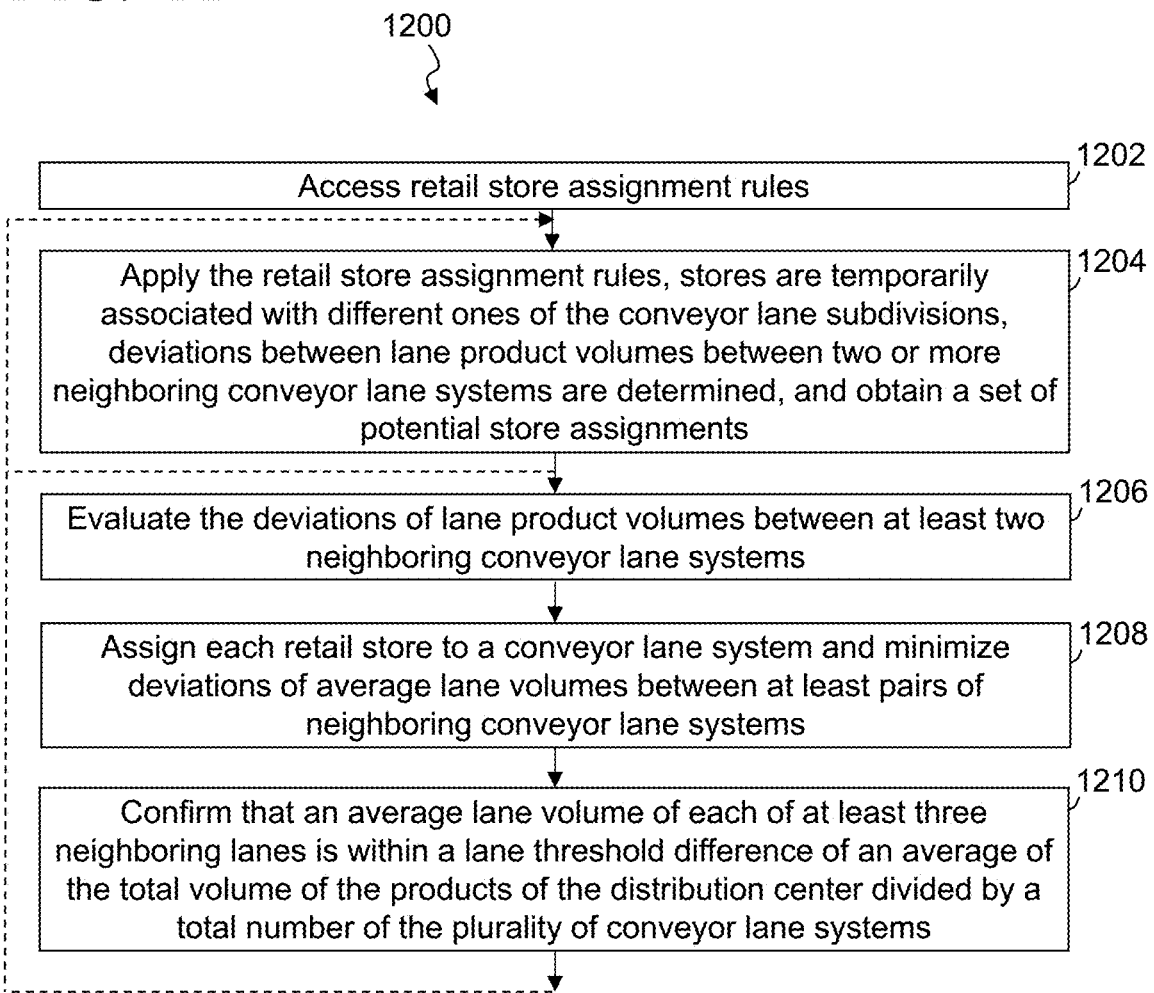
FIG. 12 illustrates a simplified flow diagram of an exemplary process to assign retail stores to one or more of the conveyor lane systems within a lane subdivision with which the retail store has been associated, in accordance with some embodiments.

FIG. 12 illustrates a simplified flow diagram of an exemplary process 1200 to assign retail stores to one or more of the conveyor lane systems 106 within a lane subdivision 202-205 with which the retail store has been associated, in accordance with some embodiments. This lane assignment process 1200 can be used, in some implementations, as at least part of step 1008 of the control process 1000. In step 1202, retail store assignment rules are accessed. In step 1204, the retail store assignment rules are applied and an iterative process is performed where the stores, which are assigned to the lane subdivision being considered, are temporarily associated with different ones of the conveyor lane subdivisions, and based on historic orders (e.g., average product volume for a store based on four months of orders), the deviations between lane product volumes between two or more neighboring conveyor lane systems are determined, and a set of different potential store assignments to different ones of the conveyor lane systems are obtained.

In step 1206 deviations of lane product volumes are evaluated between at least two neighboring conveyor lane systems. In other implementations, step 1206 include the evaluation of deviations of lane product volumes between at least three neighboring conveyor lane systems. In step 1208, the retail store assignment rules continue to be applied, and each of the plurality of retail stores is assigned to a respective conveyor lane system 106 in distributing the total volume of the products to further balance a distribution of each of the subdivision volumes of products across the subset of multiple conveyor lane systems of the respective subdivision and to minimize deviations of average lane volumes between at least pairs of neighboring conveyor lane systems of the respective subdivision. Some embodiments additionally or alternatively include optional step 1210 where the retail store assignment rules continue to be applied to confirm, for each day of a week a distribution center is active and that products are distributed through the distribution facility, that an average lane volume of each of at least three neighboring lanes is within a lane threshold difference of an average of the total volume of the products of the distribution center divided by a total number of the plurality of conveyor lane systems 106.

Figure 13:
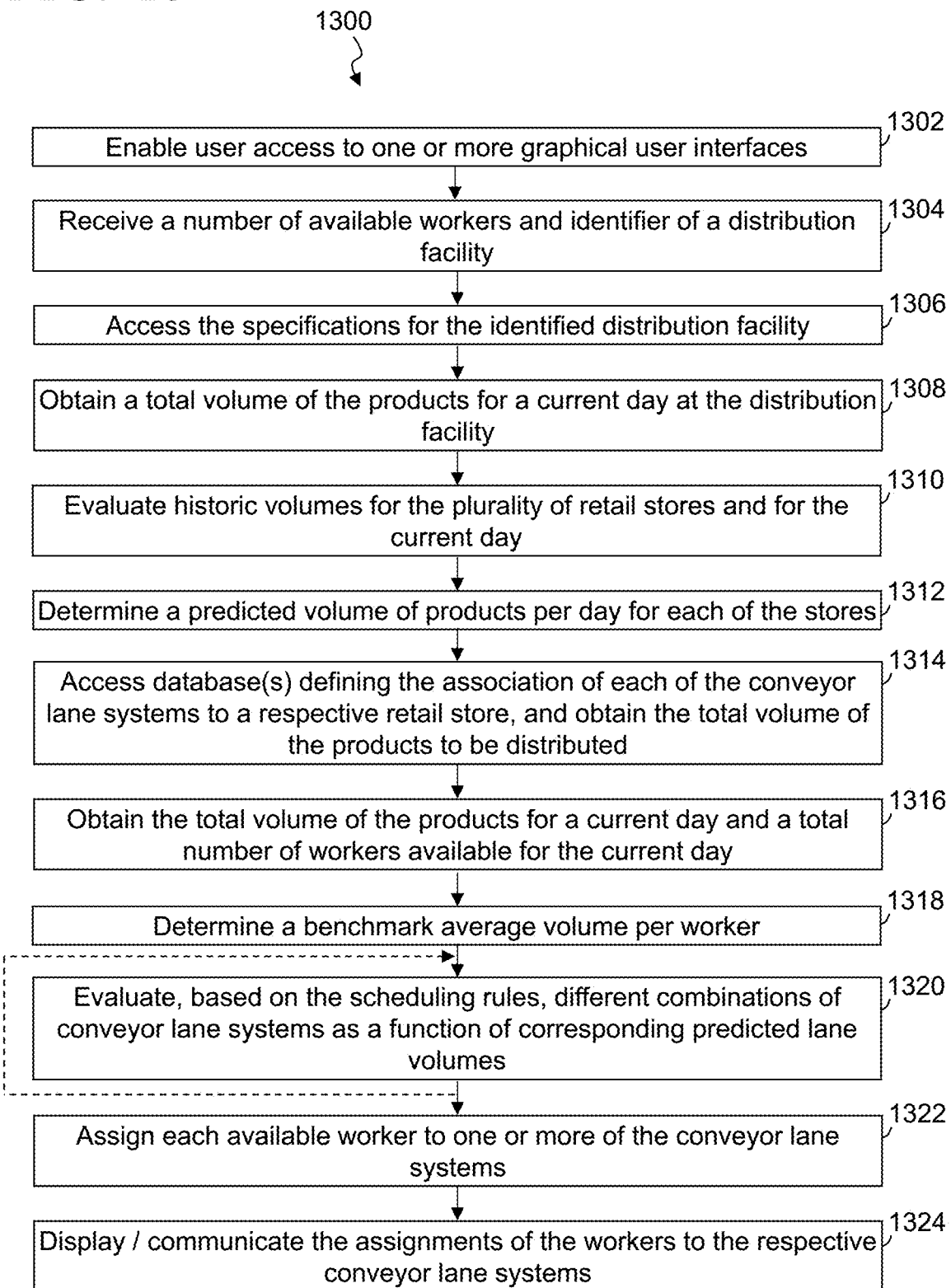
FIG. 13 illustrates a simplified flow diagram of an exemplary process to schedule workers to one or more conveyor lane systems to prepare products and/or move product for delivery, in accordance with some embodiments.

FIG. 13 illustrates a simplified flow diagram of an exemplary process 1300 to schedule workers to one or more conveyor lane systems 106 to prepare products and/or move product for delivery (e.g., stage products for loading into a delivery vehicle, loading one or more delivery vehicles, etc.), in accordance with some embodiments. This worker scheduling process 1300 can be used, in some implementations, as at least part of step 1022 of the control process 1000. In some embodiments, the process includes optional step 1302, where a user is enabled access, typically through a user computing device, to one or more graphical user interfaces. In optional step 1304, a number or workers is received through the graphical user interface where the user is enabled to enter the number of available workers, typically for a given day. Some embodiments provide the user with a graphical user interface that allows the user to specify a number of workers and/or specify specific workers that are available (e.g., the assignment GUI 600). Additionally or alternatively, workers may register with a system upon arrival and/or at starting a shift, and this information is accessed to determine a number of available workers. The assignment GUI may allow a user (e.g., supervisor, manager, etc.) to make modifications, such as limitation a number of workers to be scheduled to conveyor lane systems, selecting particular workers for scheduling to conveyor lane systems, other such modifications, or a combination of such modifications that may affect the number of workers available on a given day to be scheduled to one or more conveyor lane systems. In some embodiments the GUI may further enable the user to specify an identifier of the distribution facility. In step 1306, specifications for the identified distribution facility are accessed. The distribution facility specifications can include, but are not limited to identifiers of each of the plurality of conveyor lane systems, identifiers of each of the retail stores that are to receive products from the identified distribution facility, conveyor lane assignments of each of the retail stores, bay door identifiers corresponding to the each of one or more of the conveyor lane systems, dimensions of the conveyor lane systems 106 and/or the product feed conveyor system 104, distance information (e.g., distances between conveyor lane systems, distances between bay doors, distances between conveyor lane systems and respective bay door, etc.), other such specification information, and typically a combination of two or more of such specification information.

In step 1308, a total volume of the products for a current day is obtained for the identified distribution facility. This total volume may be determined based on ordered products, product availability at the distribution facility, expected product deliveries at the distribution facility, other such information, and typically a combination of such information. In step 1310, historic volumes are evaluated for each of the plurality of retail stores and for a current day and/or each day of the week that products are distributed through the distribution facility. In step 1312, a predicted volume of products per day is determined that is predicted to be distributed to the respective retail store for the current day for which workers are being scheduled. This scheduling may be a current day or may be day in the future (e.g., tomorrow, next week, etc.). In step 1314, one or more databases are accessed that store at least the association of each of the plurality conveyor lane systems 106 to a respective one of the plurality of retail stores, the corresponding predicted volume of products per day predicted to be distributed to the respective retail store. Further, a database may be accessed to obtain the total volume of the products to be distributed from the distribution facility at least for the day in which workers are being scheduled. In step 1316, the total volume of the products for a current day of the week and a total number of workers available for the current day are accessed. In step 1318, a benchmark average volume per worker is determined as a function of the total volume of the products and the total number of workers available at least for the day being scheduled.

In step 1320, scheduling rules are accessed and applied to evaluate, based on the scheduling rules, different combinations of conveyor lane systems as a function of corresponding predicted lane volumes. In some embodiments, step 1320 is an iterative process that evaluates different combinations of conveyor lane systems to determine sets of one or more conveyor lane systems that minimize volumes of products for the different sets of one or more conveyor lane systems and/or balances volumes of products between the different sets of one or more conveyor lane systems. In some applications, for example, the conveyor lane systems 106 are grouped into sets of one or more conveyor lane systems to minimize respective standard deviations of a summation of predicted lane volumes, for each of the sets of the one or more conveyor lane systems to be assigned to the respective worker, from the benchmark average volume per worker. In step 1322 each available worker is assigned to one of the sets of one or more of the conveyor lane systems 106. Again, the assignments, in some implementations, attempts to minimize standard deviations of a summation of predicted lane volumes, of the one or more conveyor lane systems to be assigned to the respective worker, from the benchmark average volume per worker. In optional step 1324, the assignments of the workers to the respective conveyor lane systems is displayed through a graphical user interface on a display of the computing device, communicated to a user and/or workers (e.g., email, text message, short-message-service, multimedia messaging service, etc.), and/or otherwise made available to a user and/or worker (e.g., displayed on a general display that is visually accessible to the workers to be assigned).

Figure 14:
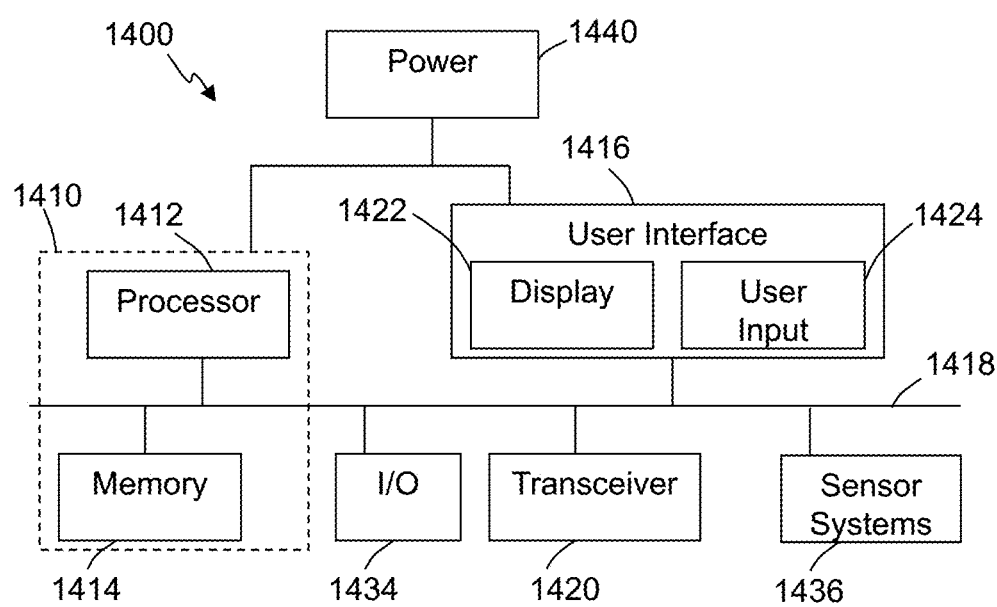
FIG. 14 illustrates an exemplary system for use in implementing methods, techniques, circuits, systems, devices, apparatuses, servers, sources to control a product distribution conveyor system, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 14 illustrates an exemplary system 1400 that may be used for implementing any of the components, circuits, circuitry, systems, functionality, apparatuses, processes, or devices of the product distribution conveyor system 100, and/or other above or below mentioned systems or devices, or parts of such circuits, circuitry, functionality, systems, apparatuses, processes, or devices. For example, the system 1400 may be used to implement some or all of the one or more conveyor control circuits 102, product feed conveyor systems 104, conveyor lane systems 106, routing systems 108, sensor systems 110, databases 114, inbound conveyor systems 116, scheduling control circuits 122, volume prediction systems 124, user computing device 126, and/or other such components, circuitry, functionality and/or devices. However, the use of the system 1400 or any portion thereof is certainly not required.

By way of example, the system 1400 may comprise a control circuit or processor module 1412, memory 1414, and one or more communication links, paths, buses or the like 1418. Some embodiments may include one or more user interfaces 1416, and/or one or more internal and/or external power sources or supplies 1440. The control circuit 1412 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1412 can be part of control circuitry and/or a control system 1410, which may be implemented through one or more processors with access to one or more memory 1414 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1400 may be used to implement one or more of the above or below, or parts of, components, circuits, systems, processes and the like.

The user interface 1416 can allow a user to interact with the system 1400 and receive information through the system. In some instances, the user interface 1416 includes a display 1422 and/or one or more user inputs 1424, such as buttons, touch screen, track ball, keyboard, mouse, etc., which can be part of or wired or wirelessly coupled with the system 1400. Typically, the system 1400 further includes one or more communication interfaces, ports, transceivers 1420 and the like allowing the system 1400 to communicate over a communication bus, a distributed computer and/or communication network 112 (e.g., a local area network (LAN), the Internet, wide area network (WAN), etc.), communication link 1418, other networks or communication channels with other devices and/or other such communications or combination of two or more of such communication methods. Further, the transceiver 1420 can be configured for wired, wireless, optical, fiber optical cable, satellite, or other such communication configurations or combinations of two or more of such communications. Some embodiments include one or more input/output (I/O) ports 1434 that allow one or more devices to couple with the system 1400. The I/O ports can be substantially any relevant port or combinations of ports, such as but not limited to USB, Ethernet, or other such ports. The I/O interface 1434 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices. In some embodiments, one or more systems 1400 comprise one or more sensor systems 1436 to sense one or more conditions, movement, states, changes in states, changes in position, orientation, product information, product conditions, and/or other such factors that can be sensed.

The system 1400 comprises an example of a control and/or processor-based system with the control circuit 1412. Again, the control circuit 1412 can be implemented through one or more processors, controllers, central processing units, logic, software and the like. Further, in some implementations the control circuit 1412 may provide multiprocessor functionality.

The memory 1414, which can be accessed by the control circuit 1412, typically includes one or more processor-readable and/or computer-readable media accessed by at least the control circuit 1412, and can include volatile and/or nonvolatile media, such as RAM, ROM, EEPROM, flash memory and/or other memory technology. Further, the memory 1414 is shown as internal to the control system 1410; however, the memory 1414 can be internal, external or a combination of internal and external memory. Similarly, some or all of the memory 1414 can be internal, external or a combination of internal and external memory of the control circuit 1412. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 610. The memory 1414 can store code, software, executables, scripts, data, content, lists, programming, programs, log or history data, user information, customer information, product information, and the like. While FIG. 14 illustrates the various components being coupled together via a bus, it is understood that the various components may actually be coupled to the control circuit and/or one or more other components directly.

Some embodiments provide a product distribution conveyor system 100 that can be utilized in a retail product distribution facility, retail fulfillment facility, and/or other such facilities where large quantities of items are transported through the facility utilizing a distributed conveyor system. Further, the system controls and enhances the performance of the product distribution conveyor system 100 by, in part reducing congestion and backlogs throughout the product distribution conveyor system 100. Further, some embodiments improve the operation of the product distribution conveyor system 100 to balance product volume distribution across the numerous conveyor lane systems 106, while further balancing product volume distribution between lane subdivisions 202-205 of the product distribution conveyor system 100 and correspondingly balances product distribution to the multiple bay doors 302 of the facility. The balancing of product distribution across lane subdivisions further improves sortation system flow of the product feed conveyor systems 104 and the conveyor lane systems 106. Some embodiments provide a system that provides the optimal balance of retail stores to conveyor lane systems in a distribution facility, which may be automatically implemented and/or controlled through an interface accessible to a user, manager, supervisor or the like. Similarly, the enhanced product distribution through the distribution conveyor system 100 results in faster loads and reduced overhead.

Still further, some embodiments improve the distribution conveyor system 100 in part through the balancing of product and/or case volume workload that are assigned to multiple workers and respective bay doors 302. User interfaces allow users to input information and acquire information about the assignment of retail stores to lane subdivisions and/or conveyor lane systems, as well as the assignment of workers to conveyor lane systems to balance product distribution over the conveyor system and the workload among works to enhance the operation of the conveyor system. Some embodiments assign workers to conveyor lane systems based a headcount or number of available works. In some applications, a graphical user interface can be accessed by a manager, supervisor, other such worker or automatically to receive the number of available workers and allow the system to balance the conveyor lane system workers are assignment. Such worker assignments can be performed monthly, weekly, daily, or other relevant period. In some embodiments, the system provides access to graphical user interfaces that provide information to optimization engines that can balance product volumes over the lane subdivisions 202-205 and/or the conveyor lane systems, and/or assign workers to one of multiple sets of one or more conveyor lane systems based on product volume expect at different conveyor lane systems and balance workloads between available workers.

Many previous conveyor systems experience congestion, backlogs, delays and other problems in part because of the operation of the conveyor system in distributing products. The product distribution conveyor system 100 in part balances product volume across the multiple lane subdivisions through the adjustment of store to conveyor lane system assignments. The system, however, can further take into account the cost of such adjustments and attempt to limit or minimize changes to assignments, and/or limit the frequency of such adjustments. The conveyor control circuits 102 can evaluate total product volume and individual store product volumes in view of the current store to conveyor lane system assignments, and provides updated store to conveyor lane system assignments when adjustments provide a threshold improvement in efficiency and/or predicted product throughput. In some embodiments, the conveyor control circuits can query data from one or more databased and access the product volume and current store to conveyor lane system assignments. Based in part on the total product volume through the distribution facility, the conveyor control circuit can assign retail stores to one of the multiple lane subdivisions 202-205 to balance the total product volume across the multiple lane subdivisions. To further enhance the operation of the system, in some embodiments the conveyor control circuit can assign retail stores to one or more conveyor lane systems within the lane subdivision with which the store has been assigned. Some embodiments additional or alternatively apply a heuristic approach to evaluate lane product volumes of neighboring conveyor lane systems and group conveyor lane systems into sets of one or more conveyor lane systems based on the number of available workers and the lane product volumes for the lanes of the set in an effort to minimize a division of an assigned total worker product volume for the set of one or more conveyor lane systems for which a worker is responsible relative to other workers and/or to a benchmark average volume per worker.

Historically, the volume of products through distribution facilities are not balanced. Similarly, workers have historically been assigned to shipping lanes with some workers receive far more volume than other workers. The product distribution conveyor system 100, however, provides an optimization system and engine that determines the store and lane alignment, and/or an optimization system and engine that determines the allocation of workers to conveyor lane systems. Further, the system provides a user interface through one or more graphical user interfaces that enable a manager, supervisor or the like to interact with the system to obtain assignments and worker scheduling in real time and within seconds. The assignments can automatically be communicated to relevant control systems to implement the routing of products through the control of the inbound conveyor systems 116, feed conveyor systems 104, the routing systems 108, conveyor lane systems 106, labeling systems that generate and apply relevant labeling to products moving along one or more of the inbound conveyor systems 116, feed conveyor systems 104, and/or conveyor lane systems 106, sensor systems 110, and other such systems to enhance the product through the conveyor system of the distribution facility, reduce product congestion, enhance throughput of products, and enhance the distribution of products.

Some embodiments provide a product distribution conveyor system of a product distribution facility, wherein the product distribution conveyor system comprises: a conveyor control circuit; at least one product feed conveyor system comprising at least one feed conveyor and multiple feed conveyor motor systems communicatively coupled with and controlled by the conveyor control circuit to implement movement and control of the feed conveyor to move products along the feed conveyor; a plurality of conveyor lane systems cooperated with and configured to receive products fed to the conveyor lane systems from the feed conveyor system, wherein each of the conveyor lane systems is associated with at least one bay door of the distribution facility and through which products are loaded into delivery vehicles, and wherein each of the plurality of conveyor lane systems comprises at least one lane conveyor and at least one lane motor communicatively coupled with and controlled by the conveyor control circuit to implement movement and control of the lane conveyor to move one or more of the products received from the feed conveyor system and along the lane conveyor toward the respective bay door; a plurality of routing systems cooperated with the at least one feed conveyor and communicatively coupled with the conveyor control circuit, wherein each of the plurality of routing systems is configured to cause the movement of respective products transported on the at least one feed conveyor system to a respective one of the lane conveyors of the plurality of conveyor lane systems; and a plurality of sensor systems each positioned adjacent the at least one of the feed conveyor systems and the lane conveyors, and configured to detect product identifying information of each product moved along the respective at least one feed conveyor, and communicate the product identifying information of each of the products to the conveyor control circuit, wherein the conveyor control circuit is configured to control the feed conveyor system and one or more of the plurality of routing systems to move each of the products onto an appropriate conveyor lane system associated with an intended retail store to receive the respective product; wherein the conveyor control circuit is further configured to control and enhance throughput of the at least one feed conveyor system by accessing association rules and applies the association rules to associate each of the plurality of conveyor lane systems with at least one of a plurality of retail stores that order products to be received from the distribution facility such that a total volume of the products shipped from the distribution facility is substantially equally distributed over the plurality of conveyor lane systems comprising organizationally subdividing the plurality of conveyor lane systems to define a plurality of lane subdivisions each comprising a subsets of multiple conveyor lane systems of the plurality of conveyor lane systems, and associating each retail store of the plurality of retail stores with a respective one of the plurality of lane subdivisions to minimize deviations of subdivision volumes of products moved through each of the plurality of lane subdivisions.

Some embodiments provide methods of controlling product distribution through a distribution conveyor system of a product distribution facility, comprising: causing the transport of products along at least one product feed conveyor system comprising at least one feed conveyor and multiple feed conveyor motor systems communicatively coupled with and controlled by a conveyor control circuit and implementing movement and control of the feed conveyor to move the products along the feed conveyor and to respective ones of a plurality of conveyor lane systems cooperated with and configured to receive products fed to the conveyor lane systems from the feed conveyor system, wherein each of the conveyor lane systems is associated with at least one bay door of the distribution facility and through which products are loaded into delivery vehicles, and wherein each of the plurality of conveyor lane systems comprises at least one lane conveyor and at least one lane motor communicatively coupled with and controlled by the conveyor control circuit; receiving product identifying information, detected through a plurality of sensor systems each positioned adjacent the at least one of the feed conveyors and the lane conveyors, of each product moved along the respective at least one feed conveyor and communicated from the sensor systems; controlling the feed conveyor system and movement of one or more of a plurality of routing systems cooperated with the at least one feed conveyor based on the product identifying information for each of the products to move each of the products along the at least one feed conveyor and move the respective products by the routing systems onto an appropriate conveyor lane system of the plurality of conveyor lane systems associated with an intended retail store to receive the respective product; controlling movement and control of the lane conveyor to move one or more of the products received from the feed conveyor system along the lane conveyor toward the respective bay door; and controlling and enhancing throughput of the at least one feed conveyor system by accessing association rules and applying the association rules and associating each of the plurality of conveyor lane systems with at least one of a plurality of retail stores that order products to be received from the distribution facility such that a total volume of the products shipped from the distribution facility is substantially equally distributed over the plurality of conveyor lane systems comprising organizationally subdividing the plurality of conveyor lane systems to define a plurality of lane subdivisions each comprising a subsets of multiple conveyor lane systems of the plurality of conveyor lane systems, and associating each retail store of the plurality of retail stores with a respective one of the plurality of lane subdivisions to minimize deviations of subdivision volumes of products moved through each of the plurality of lane subdivisions.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A product distribution conveyor system of a product distribution facility, wherein the product distribution conveyor system comprises:
   a conveyor control circuit;
   at least one product feed conveyor system comprising at least one feed conveyor and multiple feed conveyor motor systems communicatively coupled with and controlled by the conveyor control circuit to implement movement and control of the feed conveyor to move products along the feed conveyor;
   a plurality of conveyor lane systems cooperated with and configured to receive products fed to the conveyor lane systems from the feed conveyor system, wherein each of the conveyor lane systems is associated with at least one bay door of the distribution facility and through which products are loaded into delivery vehicles, and wherein each of the plurality of conveyor lane systems comprises at least one lane conveyor and at least one lane motor communicatively coupled with and controlled by the conveyor control circuit to implement movement and control of the lane conveyor to move one or more of the products received from the feed conveyor system and along the lane conveyor toward the respective bay door;
   a plurality of routing systems cooperated with the at least one feed conveyor and communicatively coupled with the conveyor control circuit, wherein each of the plurality of routing systems is configured to cause the movement of respective products transported on the at least one feed conveyor system to a respective one of the lane conveyors of the plurality of conveyor lane systems; and
   a plurality of sensor systems each positioned adjacent the at least one of the feed conveyors and the lane conveyors, and configured to detect product identifying information of each product moved along the respective at least one feed conveyor and the lane conveyors, and communicate the product identifying information of each of the products to the conveyor control circuit, wherein the conveyor control circuit is configured to control the feed conveyor system and one or more of the plurality of routing systems to move each of the products onto an appropriate conveyor lane system associated with an intended retail store to receive the respective product;
   wherein the conveyor control circuit is further configured to control throughput of the at least one feed conveyor system by accessing association rules and applying the association rules to associate each of the plurality of conveyor lane systems with at least one of a plurality of retail stores that order products to be received from the distribution facility in balancing a distribution of a total volume of the products shipped from the distribution facility over the plurality of conveyor lane systems comprising organizationally subdividing the plurality of conveyor lane systems to define a plurality of lane subdivisions each comprising a subsets of multiple conveyor lane systems of the plurality of conveyor lane systems, and associating each retail store of the plurality of retail stores with a respective one of the plurality of lane subdivisions to minimize deviations of subdivision volumes of products moved through each of the plurality of lane subdivisions.

2. The system of claim 1, wherein the sensor systems comprise at least one of a bar code reader, a radio frequency identifier (RFID) tag reader, and an image processing system.

3. The system of claim 1, wherein the conveyor control circuit is configured to confirm, as the product moves along the feed conveyor system, the product identifying information as a product that is scheduled to be delivered to the intended retail store that ordered the product, identifies a conveyor lane system associated with the intended retail store and controls the feed conveyor system and the one or more of the plurality of routing systems to move the product onto the identified conveyor lane system associated with the intended retail store.

4. The system of claim 1, wherein the conveyor control circuit is further configured to access retail store assignment rules and apply the retail store assignment rules to assign each of the plurality of retail stores to a respective conveyor lane system in distributing the total volume of products to further balance a distribution of each of the subdivision volumes of products across the subset of multiple conveyor lane systems of the respective subdivision comprising minimize deviations of average lane volumes between at least pairs of neighboring conveyor lane systems of the respective subdivision.

5. The system of claim 4, wherein the conveyor control circuit in assigning the retail stores to the respective conveyor lane system is further configured to confirm, for each day of a week that products are distributed through the distribution facility, that an average lane volume of at least three neighboring lanes is within a first lane threshold difference of an average of the total volume of the products per total number of the plurality of conveyor lane systems.

6. The system of claim 5, further comprising:
   a scheduling control circuit coupled with a database and configured to access, through the database, the total volume of the products for a current day, and apply scheduling rules to schedule each of a plurality of workers to one or more conveyor lane systems of the plurality of conveyor lane systems as a function of the assigned retail stores to the plurality of conveyor lane systems to balance workloads of the plurality of workers as a function of predict lane volumes for the current day for the retail stores assigned to the respective conveyor lane systems.

7. The system of claim 4, wherein the conveyor control circuit in minimizing the deviations of the subdivision volumes of products moved through each of the plurality of lane subdivisions is further configured to determine, for each day of a week that products are distributed through the distribution facility, a benchmark predicted subdivision product volume as a function of the total volume of the products versus the number of lane subdivisions, and minimizing predicted deviations of the subdivision volumes from the benchmark predicted subdivision product volume for the days of the week the products are distributed through the distribution facility.

8. The system of claim 4, further comprising:
a scheduling control circuit coupled with a database to access the total volume of the products for a current day and apply scheduling rules to schedule each of a plurality of workers to one or more conveyor lane systems of the plurality of conveyor lane systems as a function of the assigned retail stores to the plurality of conveyor lane systems to balance workloads of the plurality of workers as a function of predict lane volumes for the current day for the retail stores assigned to the respective conveyor lane systems.

9. The system of claim 4, further comprising:
a volume prediction system configured to evaluate, for each of the plurality of retail stores, historic volumes for each day of the week that products are distributed through the distribution facility and determine a predicted volume of products per day predicted to be distributed to the respective retail store;
a database storing the association of each of the plurality conveyor lane systems to a respective one of the plurality of retail stores, the corresponding predicted volume of products per day predicted to be distributed to the respective retail store, and the total volume of the products to be distributed from the distribution facility per day; and
a scheduling control circuit coupled with the database to access the total volume of the products for a current day of the week and a total number of workers available for the current day, determine a benchmark average volume per worker as a function of the total volume of the products and the total number of workers available, and apply scheduling rules to evaluate different combinations of conveyor lane systems as a function of corresponding predicted lane volumes, and assign each worker to one or more of the conveyor lane systems in minimizing standard deviations of a summation of predicted lane volumes, of the one or more conveyor lane systems to be assigned to the respective worker, from the benchmark average volume per worker.

10. The system of claim 9, wherein the scheduling control circuit is further configured to enable access, through a user computing device, to a graphical user interface enabling entry of the number of available workers and an identifier of the distribution facility, and the scheduling control circuit is configured to access specifications for the identified distribution facility comprising at least identifiers of each of the plurality of conveyor lane systems and identifiers of each of the retail stores that are to receive products from the identified distribution facility, and to display the assignments of the workers to the respective conveyor lane systems.

11. A method of controlling product distribution through a distribution conveyor system of a product distribution facility, comprising:
causing the transport of products along at least one product feed conveyor system comprising at least one feed conveyor and multiple feed conveyor motor systems communicatively coupled with and controlled by a conveyor control circuit and implementing movement and control of the feed conveyor to move the products along the feed conveyor and to respective ones of a plurality of conveyor lane systems cooperated with and configured to receive products fed to the conveyor lane systems from the feed conveyor system, wherein each of the conveyor lane systems is associated with at least one bay door of the distribution facility and through which products are loaded into delivery vehicles, and wherein each of the plurality of conveyor lane systems comprises at least one lane conveyor and at least one lane motor communicatively coupled with and controlled by the conveyor control circuit;
receiving product identifying information, detected through a plurality of sensor systems each positioned adjacent the at least one of the feed conveyors and the lane conveyors, of each product moved along the respective at least one feed conveyor and communicated from the sensor systems;
controlling the feed conveyor system and movement of one or more of a plurality of routing systems cooperated with the at least one feed conveyor based on the product identifying information for each of the products to move each of the products along the at least one feed conveyor and move the respective products by the routing systems onto an appropriate conveyor lane system of the plurality of conveyor lane systems associated with an intended retail store to receive the respective product;
controlling movement and control of the lane conveyor to move one or more of the products received from the feed conveyor system along the lane conveyor toward the respective bay door; and
controlling throughput of the at least one feed conveyor system by accessing association rules and applying the association rules and associating each of the plurality of conveyor lane systems with at least one of a plurality of retail stores that order products to be received from the distribution facility in balancing a distribution of a total volume of the products shipped from the distribution facility over the plurality of conveyor lane systems comprising organizationally subdividing the plurality of conveyor lane systems to define a plurality of lane subdivisions each comprising a subsets of multiple conveyor lane systems of the plurality of conveyor lane systems, and associating each retail store of the plurality of retail stores with a respective one of the plurality of lane subdivisions to minimize deviations of subdivision volumes of products moved through each of the plurality of lane subdivisions.

12. The method of claim 11, wherein the detecting the product identifying information comprises detecting at least one of: bar code identifying information through one or more bar code readers, a radio frequency identifier (RFID) information through one or more RFID tag readers, and image information through one or more image processing systems.

13. The method of claim 11, further comprising:
confirming, as the product moves along the feed conveyor system, the product identifying information as a product that is scheduled to be delivered to the intended retail store that ordered the product;
identifying a conveyor lane system associated with the intended retail store; and controlling the feed conveyor system and the one or more of the plurality of routing systems to move the product onto the identified conveyor lane system associated with the intended retail store.

14. The method of claim 11, further comprising:
accessing retail store assignment rules; and
applying the retail store assignment rules and assigning each of the plurality of retail stores to a respective conveyor lane system in distributing the total volume of the products to further balance a distribution of each of the subdivision volumes of products across the subset of multiple conveyor lane systems of the respective subdivision comprising minimize deviations of average lane volumes between at least pairs of neighboring conveyor lane systems of the respective subdivision.

15. The method of claim 14, wherein the assigning the retail stores to the respective conveyor lane system further comprises:
confirming, for each day of a week that products are distributed through the distribution facility, that an average lane volume of at least three neighboring lanes is within a first lane threshold difference of an average of the total volume of the products per total number of the plurality of conveyor lane systems.

16. The method of claim 15, further comprising:
accessing, through a database, the total volume of the products for a current day;
applying scheduling rules and scheduling each of a plurality of workers to one or more conveyor lane systems of the plurality of conveyor lane systems as a function of the assigned retail stores to the plurality of conveyor lane systems balancing workloads of the plurality of workers as a function of predict lane volumes for the current day for the retail stores assigned to the respective conveyor lane systems.

17. The method of claim 14, wherein the minimizing the deviations of the subdivision volumes of products moved through each of the plurality of lane subdivisions further comprises:
determining, for each day of a week that products are distributed through the distribution facility, a benchmark predicted subdivision product volume as a function of the total volume of the products versus the number of lane subdivisions; and
minimizing predicted deviations of the subdivision volumes from the benchmark predicted subdivision product volume for the days of the week the products are distributed through the distribution facility.

18. The method of claim 14, further comprising:
accessing the total volume of the products for a current day;
accessing and applying scheduling rules;
scheduling, based on the scheduling rules, each of a plurality of workers to one or more conveyor lane systems of the plurality of conveyor lane systems as a function of the assigned retail stores to the plurality of conveyor lane systems balancing workloads of the plurality of workers as a function of predict lane volumes for the current day for the retail stores assigned to the respective conveyor lane systems.

19. The method of claim 14, further comprising:
evaluating, for each of the plurality of retail stores, historic volumes for each day of the week that products are distributed through the distribution facility;
determining a predicted volume of products per day predicted to be distributed to the respective retail store;
accessing a database storing the association of each of the plurality conveyor lane systems to a respective one of the plurality of retail stores, the corresponding predicted volume of products per day predicted to be distributed to the respective retail store, and the total volume of the products to be distributed from the distribution facility per day;
accessing the total volume of the products for a current day of the week and a total number of workers available for the current day, determining a benchmark average volume per worker as a function of the total volume of the products and the total number of workers available;
accessing scheduling rules;
evaluating, based on the scheduling rules, different combinations of conveyor lane systems as a function of corresponding predicted lane volumes; and
assigning each worker to one or more of the conveyor lane systems in minimizing standard deviations of a summation of predicted lane volumes, of the one or more conveyor lane systems to be assigned to the respective worker, from the benchmark average volume per worker.

20. The method of claim 19, further comprising:
enabling access, through a user computing device, to a graphical user interface;
enabling entry, through the graphical user interface, of the number of available workers and an identifier of the distribution facility;
accessing specifications for the identified distribution facility comprising at least identifiers of each of the plurality of conveyor lane systems and identifiers of each of the retail stores that are to receive products from the identified distribution facility; and
displaying the assignments of the workers to the respective conveyor lane systems.

* * * * *